United States Patent
Mizutani et al.

(10) Patent No.: US 11,654,685 B2
(45) Date of Patent: May 23, 2023

(54) MAINTENANCE METHOD AND MAINTENANCE LIQUID

(71) Applicant: Seiko Epson Corporation, Toyko (JP)

(72) Inventors: Akira Mizutani, Matsumoto (JP); Yuta Asakawa, Azumino (JP)

(73) Assignee: SEIKO EPSON CORPORATION

( * ) Notice: Subject to any disclaimer, the term of this patent is extended or adjusted under 35 U.S.C. 154(b) by 153 days.

(21) Appl. No.: 17/190,509

(22) Filed: Mar. 3, 2021

(65) Prior Publication Data

US 2021/0276334 A1    Sep. 9, 2021

(30) Foreign Application Priority Data

Mar. 3, 2020   (JP) .............................. JP2020-035591
Mar. 27, 2020  (JP) .............................. JP2020-057362

(51) Int. Cl.
   *B41J 2/165*    (2006.01)
   *C09D 11/54*    (2014.01)

(52) U.S. Cl.
   CPC ........... B41J 2/16552 (2013.01); C09D 11/54 (2013.01); *B41J 2002/16558* (2013.01)

(58) Field of Classification Search
   CPC ...... B41J 2/16552; B41J 2/16535; B41J 2/01; B41J 2002/1655; B41J 2002/16558; C09D 11/322; C09D 11/54
   See application file for complete search history.

(56) References Cited

U.S. PATENT DOCUMENTS

| | | | |
|---|---|---|---|
| 2002/0043177 A1* | 4/2002 | Koitabashi | C09D 11/40 106/31.27 |
| 2011/0069114 A1* | 3/2011 | Ikoshi | B41J 2/16552 106/31.13 |
| 2013/0070036 A1* | 3/2013 | Ooishi | C09D 11/54 347/102 |
| 2013/0321525 A1* | 12/2013 | Fujii | C09D 11/40 524/220 |
| 2014/0253631 A1* | 9/2014 | Namba | C09D 11/106 524/265 |
| 2015/0290941 A1* | 10/2015 | Mizutani | B41J 2/16535 347/31 |
| 2017/0267879 A1* | 9/2017 | Kohzuki | C09D 11/107 |
| 2017/0369723 A1 | 12/2017 | Mizutaki et al. | |
| 2020/0164652 A1* | 5/2020 | Bannai | B41J 2/16535 |

FOREIGN PATENT DOCUMENTS

JP    2017-105134 A    6/2017
JP    2018-002778 A    1/2018

* cited by examiner

*Primary Examiner* — John Zimmermann
(74) *Attorney, Agent, or Firm* — Harness, Dickey & Pierce, P.L.C.

(57) ABSTRACT

A maintenance method for an ink jet recording apparatus that performs recording using an ink composition and a treatment liquid containing a coagulant, wherein the ink jet recording apparatus has an ink jet head for ejecting the ink composition, the method includes a wiping step of wiping a nozzle-forming surface of the ink jet head with a maintenance liquid and an absorbent wiping member, and the maintenance liquid contains water that constitutes 80% or more by mass of a total mass of the maintenance liquid.

14 Claims, 7 Drawing Sheets

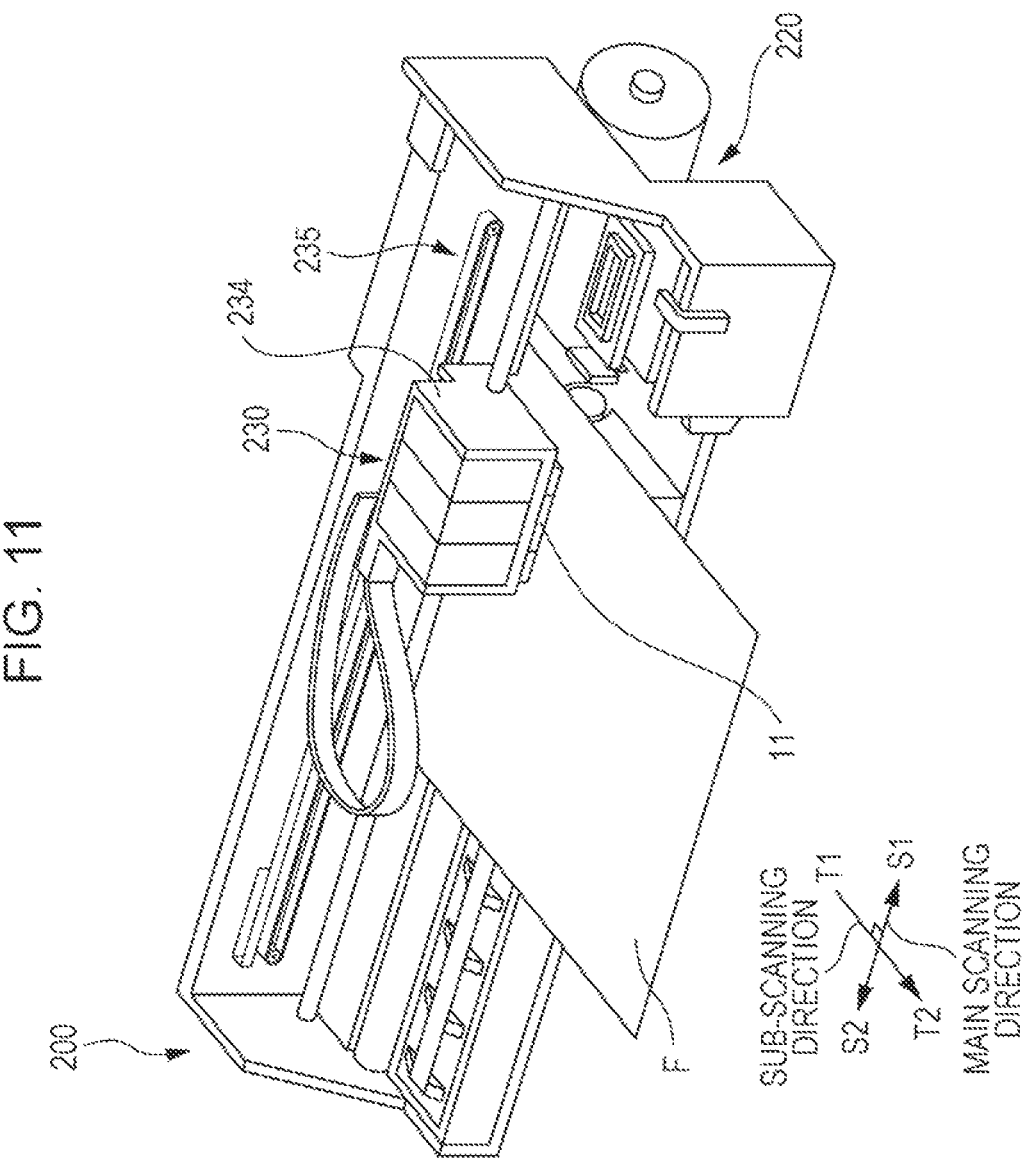

MAINTENANCE METHOD AND MAINTENANCE LIQUID

The present application is based on, and claims priority from JP Application Serial Number 2020-057362, filed Mar. 27, 2020 and JP Application Serial Number 2020-035591, filed Mar. 3, 2020, the disclosures of which are hereby incorporated by reference herein in their entirety.

BACKGROUND

1. Technical Field

The present disclosure relates to a maintenance method and a maintenance liquid.

2. Related Art

An ink jet recording method can be used to record a high-resolution image with a relatively simple apparatus and is being rapidly developed in various fields. A maintenance method for a recording apparatus has been widely studied through such development. For example, JP-A-2017-105134 discloses a maintenance method including a wiping step of wiping a nozzle-forming surface of a recording head with a cleaning liquid and an absorbing member for the purpose of providing a maintenance method with high cleaning performance when an ink composition containing specified polymer particles and a treatment liquid are used for recording. JP-A-2017-105134 discloses a cleaning liquid containing an organic solvent as an infiltration material or a humectant and specifically discloses a cleaning liquid containing 1,3-butanediol and propylene glycol in an amount of 60% by mass.

An ink jet recording method can be used to record a high-resolution image with a relatively simple apparatus and is being rapidly developed in various fields. Ejection stability has been widely studied through such development. For example, JP-A-2018-002778 discloses an aqueous ink composition with a viscosity in the range of 2 to 7 mPa·s at 20° C., a yield value of less than 0.2 mPa at 20° C., and a yield value of less than 0.8 mPa at 20° C. when water is evaporated by 25%, for the purpose of improving continuous printing stability in a high-temperature environment.

However, it has been found that cleaning performance is still insufficient when a nozzle-forming surface of an ink jet head in an ink jet recording apparatus that performs recording using an ink composition and a treatment liquid containing a coagulant is subjected to maintenance with a cleaning liquid.

An ejection head with recessed and raised portions formed on a sidewall near a nozzle exit can increase the nozzle orifice array density and achieve high speed and high image quality. Such a structure with recessed and raised portions is also referred to as a scallop structure or a continuous multistep structure.

An ink jet head with such a structure used to apply ink to a heated recording medium for recording still has insufficient continuous printing stability.

SUMMARY

A first aspect of the present disclosure may be as follows.

The present disclosure provides a maintenance method for an ink jet recording apparatus that performs recording using an ink composition and a treatment liquid containing a coagulant, wherein the ink jet recording apparatus has an ink jet head for ejecting the ink composition, the method includes a wiping step of wiping a nozzle-forming surface of the ink jet head with a maintenance liquid and an absorbent wiping member, and the maintenance liquid contains water that constitutes 80% or more by mass of a total mass of the maintenance liquid.

The present disclosure also provides a maintenance liquid for use in the maintenance method, wherein the maintenance liquid contains water that constitutes 80% or more by mass of the total mass of the maintenance liquid.

A second aspect of the present disclosure may be as follows.

The present disclosure provides a maintenance method for an ink jet recording apparatus that performs recording on a recording medium, wherein the ink jet recording apparatus includes an ink jet head and ejects an aqueous ink composition from a nozzle of the ink jet head onto a heated recording medium to perform recording, the ink jet head has a nozzle having a continuous multistep structure on its inner wall, the maintenance method includes a wiping step of wiping a nozzle surface of the ink jet head with an absorbent wiping member, and the aqueous ink composition contains water and resin particles.

The present disclosure provides a recording apparatus that includes an ink jet head for ejecting an aqueous ink composition containing water and resin particles, a wiping mechanism for wiping a nozzle surface of the ink jet head with an absorbent wiping member, and a heating mechanism for heating a recording medium, wherein the ink jet head has a continuous multistep structure on a nozzle inner wall.

BRIEF DESCRIPTION OF THE DRAWINGS

FIG. 11 is a perspective view of an ink jet recording apparatus according to an embodiment of the present disclosure.

DESCRIPTION OF EXEMPLARY EMBODIMENTS

Figure 1:
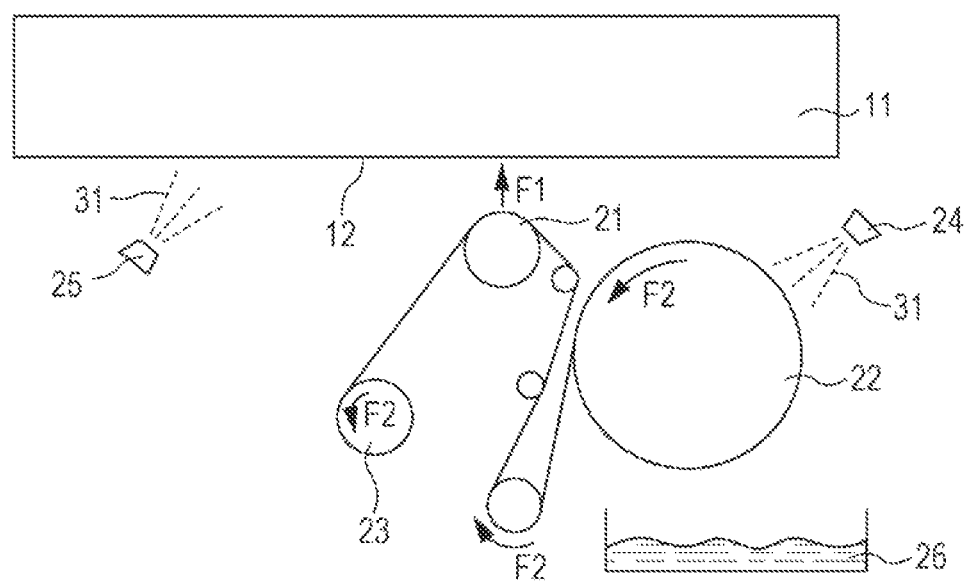
FIG. 1 is a schematic view of a wiping step in a maintenance method according to an embodiment of the present disclosure.

The first aspect of the present disclosure is described below.

Although the embodiments of the present disclosure (hereinafter referred to as "the present embodiments") are described in detail below with reference to the accompanying drawings as required, the present disclosure is not limited to these embodiments, and various modifications may be made in these embodiments without departing from the gist of the present disclosure. Like components are denoted by like reference numerals throughout the figures and are not described again. Unless otherwise specified, the positional relationship, such as up, down, left, or right, is based on the positional relationship shown in the drawings. The dimensions of components are not limited to the dimensions shown in the drawings.

1. Maintenance Method

A maintenance method according to the present embodiment is a maintenance method for an ink jet recording apparatus that performs recording using an ink composition and a treatment liquid containing a coagulant, wherein the ink jet recording apparatus has an ink jet head for ejecting the ink composition (hereinafter also referred to simply as an "ink jet recording apparatus"). The maintenance method according to the present embodiment includes a wiping step of wiping a nozzle-forming surface of the ink jet head with a maintenance liquid and an absorbent wiping member, and the maintenance liquid contains water that constitutes 80% or more by mass of the total mass of the maintenance liquid.

The use of a recording method for performing recording with an ink composition and a treatment liquid containing a coagulant can quickly fix the ink composition on a recording medium. Thus, recorded materials obtained by the recording method have high image quality. When a treatment liquid for aggregating an ink composition is used, however, a recording medium to which the treatment liquid is applied may come into contact with an ink jet head for ejecting the ink composition, or a mist of ejected treatment liquid may fly to an ink jet head. In such a case, it is assumed that an ink composition and a treatment liquid react on a nozzle-forming surface of an ink jet head and form a foreign material, which causes ejection failure.

To prevent such ejection failure, it is effective to wipe a nozzle-forming surface of an ink jet head of an ink jet recording apparatus with a wiping member. In the maintenance method according to the present embodiment, a maintenance liquid with a relatively high water content is used for wiping. This further improves cleaning performance on the nozzle-forming surface. The reason for this is, but not limited to, that a wiping member can more easily absorb the maintenance liquid with a higher water content and can more easily absorb a foreign material adhering to the nozzle-forming surface together with the maintenance liquid.

The ink composition and the treatment liquid react on a nozzle-forming surface and form a relatively large foreign material. Thus, wiping the nozzle-forming surface with a wiping member during maintenance may scrape a water-repellent film formed on the nozzle-forming surface, lower the wear resistance of the water-repellent film, and cause ejection failure. The use of the maintenance liquid with a relatively high water content makes it easier to absorb the foreign material adhering to the nozzle-forming surface into the wiping member together with the maintenance liquid and can reduce the decrease in the wear resistance of the water-repellent film.

1.1. Application Step

The maintenance method according to the present embodiment may include the step of applying the maintenance liquid to the nozzle-forming surface or the wiping member before the wiping step. The method of applying the maintenance liquid to the nozzle-forming surface or the wiping member may be, but is not limited to, a method of injecting, dropping, or spreading (coating) the maintenance liquid to apply the maintenance liquid to the nozzle-forming surface or the wiping member, or a method of impregnating the wiping member with the maintenance liquid. Thus, the nozzle-forming surface is wiped with the wiping member in the presence of the maintenance liquid.

FIG. 1 is a schematic cross-sectional view of a wiping member (cloth wiper) brought into contact with a nozzle-forming surface of an ink jet head. In FIG. 1, a wiping member 21 is pushed toward a nozzle-forming surface 12 of an ink jet head 11 in the direction of an arrow F1. In this case, a maintenance liquid 31 can be applied with a first injector 24 to a first roll 22 on which the wiping member 21 before use is wound. Alternatively, the first roll 22 on which the wiping member 21 before use is wound may be dipped into a pool 26 of the maintenance liquid 31 to apply the maintenance liquid 31 to the wiping member 21.

The position at which the maintenance liquid is applied to the wiping member 21 before the wiping member 21 reaches the nozzle-forming surface 12 is not limited to the position in FIG. 1. The maintenance liquid 31 may be applied to the wiping member 21 before use transferred by the first roll 22 in the direction of an arrow F2 at any stage before the wiping member 21 reaches the nozzle-forming surface 12.

For example, the position may be closer to the nozzle-forming surface 12. For example, the position may be immediately before a roller for pushing the wiping member 21 in the direction of the arrow F1.

The maintenance liquid 31 can be applied to the nozzle-forming surface 12 with a second injector 25.

The maintenance method may not include the application step of applying the maintenance liquid to the nozzle-forming surface or the wiping member. In such a case, the maintenance may be performed by using a wiping member to which the maintenance liquid is applied in advance.

The application step of applying the maintenance liquid to the nozzle-forming surface or the wiping member does not necessarily utilize an application mechanism, such as the injectors or pool (dipping unit), and may be appropriately modified. For example, a dropper or a coater can be used as an application mechanism.

In the maintenance liquid application step, the amount of maintenance liquid applied is the amount of maintenance liquid applied to the wiping member or the nozzle-forming surface.

The application amount is the amount of maintenance liquid used when the maintenance is performed once and the amount of maintenance liquid used per nozzle array for ejecting one (one type of) ink composition.

The amount of maintenance liquid applied may be 0.1 g or more, 0.3 g or more, or 0.5 g or more. The amount of maintenance liquid applied may be 5 g or less, 3 g or less, or 1 g or less. Such a range results in better cleaning performance and reduced waste of the maintenance liquid.

1.2. Wiping Step

The wiping step includes wiping a nozzle-forming surface of an ink jet head with a maintenance liquid and an absorbent wiping member. The wiping method is not particularly limited. For example, wiping can be performed by pressing the wiping member 21 against the nozzle-forming surface 12 (the arrow F1) and transferring the wiping member 21 or the nozzle-forming surface 12 such that the wiping member 21 is relatively transferred along the nozzle-forming surface 12.

The wiping direction may be, but is not limited to, the direction along the nozzle array. This can prevent the formation of a foreign material from being unexpectedly promoted by a portion of the wiping member in contact with a first nozzle array coming into contact with a second nozzle array or by a portion of the wiping member in contact with the second nozzle array coming into contact with the first nozzle array.

1.2.1. Maintenance Liquid 1.2.1.1. Water

The maintenance liquid contains water that constitutes 80% or more by mass of the total mass. This improves the permeability of the wiping member, facilitates taking a foreign material into the wiping member, and further improves cleaning performance. From the above perspective, the water content of the maintenance liquid may be 85% or more by mass, 90% or more by mass, or 95% or more by mass. The water content of the maintenance liquid may be 100% or less by mass, 99% or less by mass, 98.5% or less by mass, or 98% or less by mass. A water content of the maintenance liquid equal to or higher than such a range results in easier taking of a foreign material into the wiping member and higher cleaning performance.

At a water content of the maintenance liquid equal to or lower than such a range, for example, a maintenance liquid containing a small amount of organic solvent tends to more successfully remove a foreign material from the nozzle-forming surface and have higher cleaning performance than a maintenance liquid composed entirely of water.

1.2.1.2. Organic Solvent

From such a perspective, the maintenance liquid may contain an organic solvent. Examples of the organic solvent include, but are not limited to, water-miscible organic solvents, such as glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol monoethyl ether, methanol, and ethanol. Examples of the organic solvent also include organic solvents that may be contained in an ink or a treatment liquid described later.

The use of an organic solvent tends to further improve the cleaning performance, as described later, and may result in high cleaning performance.

Among the organic solvents, alkanediols having five or more carbon atoms may be particularly used from the above perspective. Alkanediols having five or more carbon atoms may have 5 to 10 or 6 to 8 carbon atoms. In particular, 1,2-alkanediol may be used.

An alkanediol having five or more carbon atoms may be 1,2-pentanediol or 1,2-hexanediol.

Among the organic solvents, polyols may have high cleaning performance. Examples of the polyols include alkane polyols having four or less carbon atoms or condensation products produced by an intermolecular condensation between hydroxy groups of alkane polyols having four or less carbon atoms. The number of carbon atoms in these may range from 2 to 3. The number of condensation of the condensation products may range from 2 to 4. The polyols have 2 or more hydroxy groups in the molecule and may have 2 to 4 hydroxy groups in the molecule.

The organic solvent content may be 20% or less by mass, 0.5% to 20% by mass, 1% to 10% by mass, 1% to 5% by mass, or 1% to 3% by mass of the total mass of the maintenance liquid. The organic solvent, particularly 0.5% or more by mass organic solvent, tends to permeate and swell or dissolve a foreign material or the like adhered to the nozzle-forming surface, more easily remove the foreign material, and further improve the cleaning performance. Furthermore, an organic solvent content of 20% or less by mass tends to result in a smaller decrease in the absorption of the maintenance liquid in the wiping member due to a relative decrease in the water content.

Among the organic solvents, polyols and alkanediols having five or more carbon atoms may be used from the above perspective, and the polyol content or the alkanediol content may be in such a range.

1.2.1.3. Surfactant

The maintenance liquid according to the present embodiment may further contain a surfactant. Examples of the surfactant include, but are not limited to, acetylenic glycol surfactants, fluorinated surfactants, and silicone surfactants.

The acetylenic glycol surfactants are not particularly limited. For example, at least one selected from 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, and alkylene oxide adducts of 2,4-dimethyl-5-decyne-4-ol may be used. Examples of commercial products of the acetylenic glycol surfactants include, but are not limited to, Olfin 104 series and E series, such as Olfin E1010 (trade name, manufactured by Air Products Japan, Inc.), and Surfynol 465 and Surfynol 61 (trade names, manufactured by Nissin Chemical Industry Co., Ltd.). The acetylenic glycol surfactants may be used alone or in combination.

Examples of the fluorinated surfactants include, but are not limited to, perfluoroalkyl sulfonates, perfluoroalkyl carboxylates, perfluoroalkyl phosphates, perfluoroalkyl ethylene oxide adducts, perfluoroalkyl betaines, and perfluoroalkylamine oxide compounds. Examples of commercial products of the fluorinated surfactants include, but are not limited to, S-144 and S-145 (trade names, manufactured by Asahi Glass Co., Ltd.); FC-170C, FC-430, and Fluorad FC-4430 (trade names, manufactured by Sumitomo 3M Ltd.); FSO, FSO-100, FSN, FSN-100, and FS-300 (trade names, manufactured by DuPont); and FT-250 and FT-251 (trade names, manufactured by NEOS Co., Ltd.). The fluorinated surfactants may be used alone or in combination.

Examples of the silicone surfactants include polysiloxane compounds and polyether-modified organosiloxanes. Specific examples of commercial products of the silicone surfactants include, but are not limited to, BYK-306, BYK-307, BYK-333, BYK-341, BYK-345, BYK-346, BYK-347, BYK-348, and BYK-349 (trade names, manufactured by BYK Japan KK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.). The silicone surfactants may be used alone or in combination.

The surfactant content may be 3% or less by mass of the total mass of the maintenance liquid. The amount of surfactant, if present, may range from 0.1% to 3% by mass of the total mass of the maintenance liquid. The surfactant content may range from 0.1% to 2% by mass or 0.3% to 1% by mass. The surfactant content may be not more than 0.1% by mass of the total mass of the maintenance liquid.

A surfactant in the maintenance liquid decreases the contact angle to the nozzle-forming surface, disadvantageously spreads the maintenance liquid containing a foreign material or the like over the nozzle-forming surface, and may unexpectedly impair the cleaning performance. From such a perspective, the surfactant content may be zero, may be minimized, or may be low. In such a case, the surfactant content may be 3% or less by mass, 2% or less by mass, or 1% or less by mass of the total mass of the maintenance liquid. Furthermore, the surfactant content may be 0.5% or less by mass, 0.3% or less by mass, 0.2% or less by mass, or 0.1% or less by mass. Furthermore, the surfactant content may be less than 0.1% by mass or 0.05% or less by mass. Furthermore, the surfactant content may be 0.01% or less by mass. The lower limit is 0% or more by mass. The lower limit may be below the detection limit.

A component content of a composition being 00% or less by mass of the total mass of the composition is also referred to as a component content of the composition being not more than 00% by mass. This means that the composition may not contain the component or may have a component content that does not exceed 00% by mass.

1.2.1.4. pH Adjuster

The maintenance liquid according to the present embodiment may further contain a pH adjuster. The pH adjuster can facilitate the adjustment of the pH of ink. Examples of the pH adjuster include, but are not limited to, inorganic acids (for example, sulfuric acid, hydrochloric acid, nitric acid, etc.), inorganic bases (for example, lithium hydroxide, sodium hydroxide, potassium hydroxide, ammonia, etc.), organic bases (triethanolamine, diethanolamine, monoethanolamine, triisopropanolamine), and organic acids (for example, adipic acid, citric acid, succinic acid, etc.). Among these, organic bases, triethanolamine, and triisopropanolamine may be used. The pH adjusters may be used alone or in combination.

The pH adjuster content may range from 0.01% to 2% by mass, 0.05% to 1% by mass, or 0.05% to 0.5% by mass of the total mass of the maintenance liquid.

1.2.1.5. Contact Angle

The contact angle of the maintenance liquid to the nozzle-forming surface may be 60 degrees or more, 70 degrees or more, 80 degrees or more, or 90 degrees or more. The contact angle of the maintenance liquid to the nozzle-forming surface may be 100 degrees or more or 105 degrees or more. A maintenance liquid with a contact angle of 60 degrees or more is less likely to spread on the nozzle-forming surface and forms droplets. A foreign material is taken into droplets of the maintenance liquid and is absorbed by the wiping member. Thus, the cleaning performance tends to be further improved. The contact angle of the maintenance liquid to the nozzle-forming surface may be 130 degrees or less, 120 degrees or less, or 110 degrees or less. A contact angle of 130 degrees or less tends to result in an increased wetted area of the nozzle-forming surface per maintenance liquid and further improved cleaning performance.

The contact angle of the maintenance liquid to the nozzle-forming surface can be adjusted by changing the amount and type of organic solvent contained in the ink composition or by the presence or absence of a surfactant. The contact angle of the maintenance liquid to the nozzle-forming surface can be obtained by measuring the contact angle of the maintenance liquid to a water-repellent film on the nozzle-forming surface. A detailed measurement method is described in examples.

1.2.1.6. Surface Tension

The surface tension of the maintenance liquid may be 20 mN/m or more, 50 mN/m or more, 55 mN/m or more, or 60 mN/m or more. When the surface tension of the maintenance liquid is 20 mN/m or more, particularly 55 mN/m or more, a foreign material is taken into droplets of the maintenance liquid and is absorbed by the wiping member. Thus, the cleaning performance tends to be further improved. The surface tension of the maintenance liquid may be 80 mN/m or less, 75 mN/m or less, or 73 mN/m or less. A surface tension of the maintenance liquid being 80 mN/m or less tends to result in an increased wetted area of the nozzle-forming surface per maintenance liquid and further improved cleaning performance.

The surface tension of the maintenance liquid can be adjusted by changing the amount and type of organic solvent contained in the ink composition or by the presence or absence of a surfactant. The surface tension of the maintenance liquid can be measured by a method described in examples.

1.2.2. Wiping Member

The wiping member may be any absorbent member, such as a sponge or a fabric, such as a woven fabric or a nonwoven fabric. The term "absorbent", as used herein, refers to the ability to absorb a maintenance liquid, an ink composition, or the like. When the wiping member is a woven fabric or a nonwoven fabric, the constituent fiber may be, but is not limited to, natural fiber, such as cellulose fiber, or synthetic fiber, such as polyester fiber. Among these, natural fiber or cellulose fiber may be used. Polyester fiber and cellulose fiber tend to have high cleaning performance. Furthermore, cellulose fiber swells with water, is soften by the maintenance liquid, and can therefore further reduce the wear of a water-repellent film on the nozzle-forming surface. Furthermore, a foreign material is taken into swollen cellulose fiber, and the cleaning performance tends to be further improved.

The wiping member 21 in FIG. 1, which is a long fabric, is transferred from the first roll 22 before use and is wound by a second roll 23 after use. Thus, the new wiping member 21 before use can come into contact with the nozzle-forming surface 12. Thus, it is possible to prevent the used wiping member 21 from coming into contact with the nozzle-forming surface 12 again and prevent the nozzle-forming surface 12 from being recontaminated with the treatment liquid or the ink composition that has permeated the used wiping member 21.

1.2.3. Ink Jet Head

Figure 2:
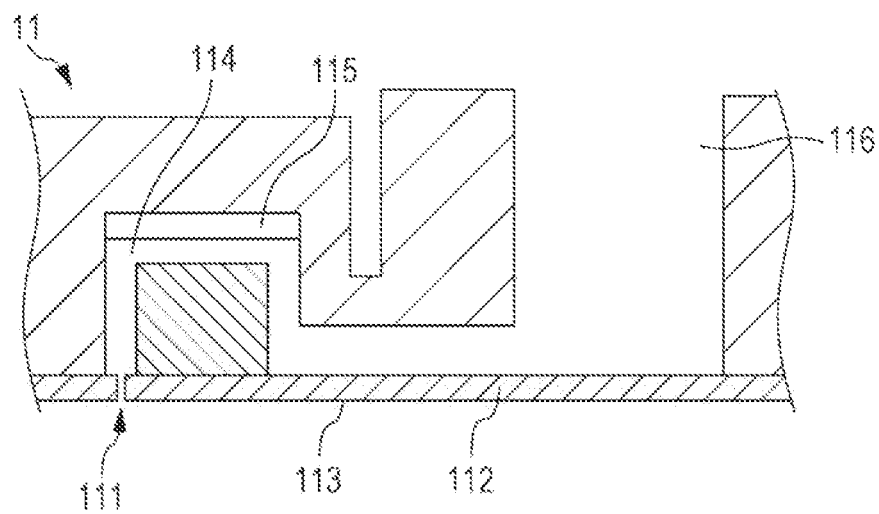
FIG. 2 is a cross-sectional view of an ink jet head according to an embodiment of the present disclosure.

To describe the nozzle-forming surface of the ink jet head to be wiped, the structure of the ink jet head is described first. FIG. 2 is a cross-sectional view of the ink jet head. The ink jet head 11 includes a nozzle plate 112 having a plurality of nozzle orifices 111 in its surface facing a recording medium (to which ink is to be applied), a pressure chamber 114 communicating with each of the nozzle orifices 111 formed in the nozzle plate 112, a press unit 115 for changing the volume of the pressure chamber 114, and an ink supply chamber 116 for supplying ink to the pressure chamber 114. In the present embodiment, the nozzle-forming surface 12 is a surface including the surface of the nozzle plate 112.

The press unit 115 may be a piezoelectric system that utilizes the drive pressure of a piezoelectric device to eject ink or a thermal system that uses bubbles formed by heating ink to eject the ink. An ink jet head that utilizes the piezoelectric system is also referred to as a piezoelectric head, and an ink jet head that utilizes the thermal system is also referred to as a thermal head.

Figure 3:
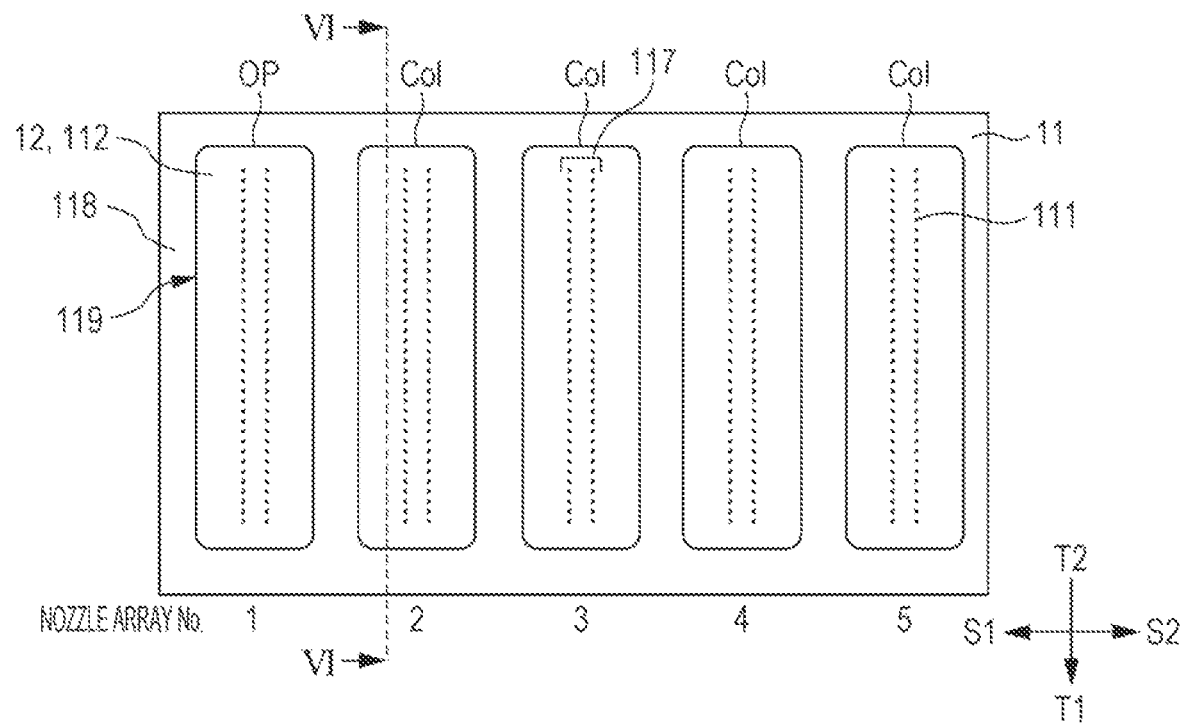
FIG. 3 is a plan view of a nozzle-forming surface of an ink jet head according to an embodiment of the present disclosure.
Figure 4:
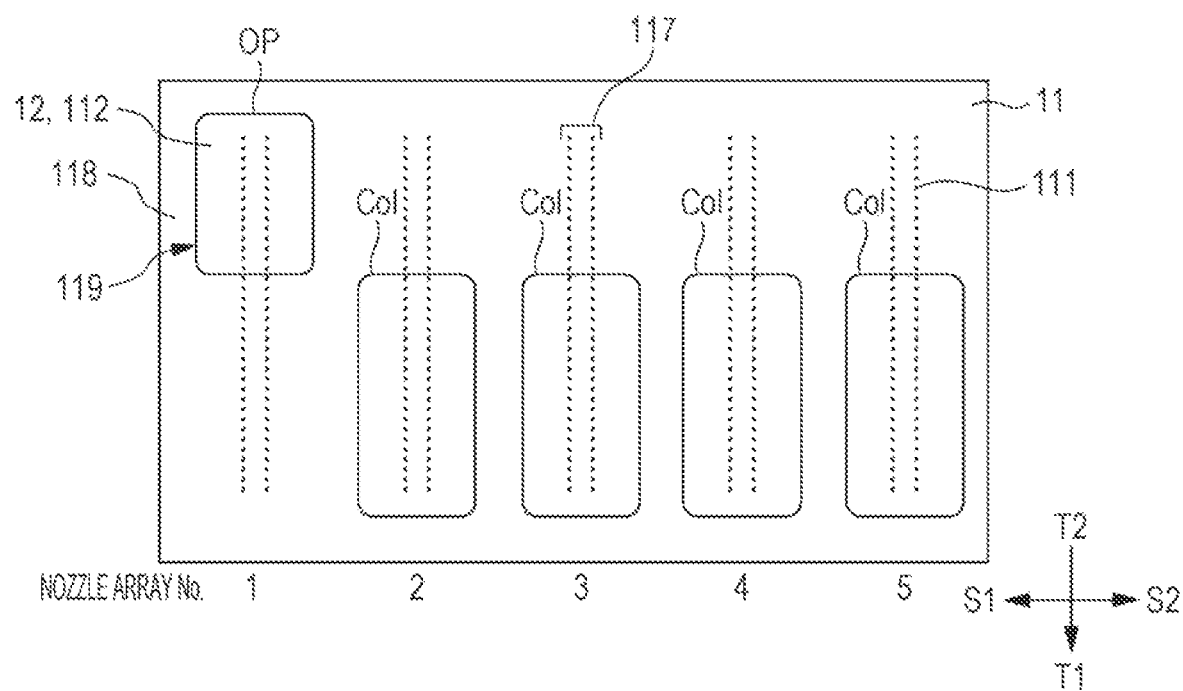
FIG. 4 is a plan view of a nozzle-forming surface of an ink jet head according to another embodiment of the present disclosure.

The nozzle plate 112 includes an array of the nozzle orifices 111 for ejecting ink. FIGS. 3 and 4 illustrate examples of the nozzle-forming surface of the ink jet head. The ink jet head 11 illustrated in FIGS. 3 and 4 includes a nozzle array 117 composed of the nozzle orifices 111 arranged in a sub-scanning direction (a recording medium transport direction) crossing the main scanning direction. A surface of the nozzle plate 112 from which ink is injected is the nozzle-forming surface 12. The nozzle array 117 for ejecting a liquid may be one array or two or more arrays, as illustrated in FIGS. 3 and 4.

In the structure in which a fixing plate for fixing the ink jet head 11 is located around the nozzle plate 112, a surface of the nozzle plate 112 and a fixing plate 118 (a surface facing the recording medium or the like during the recording operation) functions as the nozzle-forming surface 12. A piezoelectric head tends to have a step 119 between the nozzle plate 112 and the fixing plate 118, and a thermal head tends to have no step. The present disclosure is particularly useful for the nozzle-forming surface 12 with such a step, which is often difficult to clean.

Figure 6:
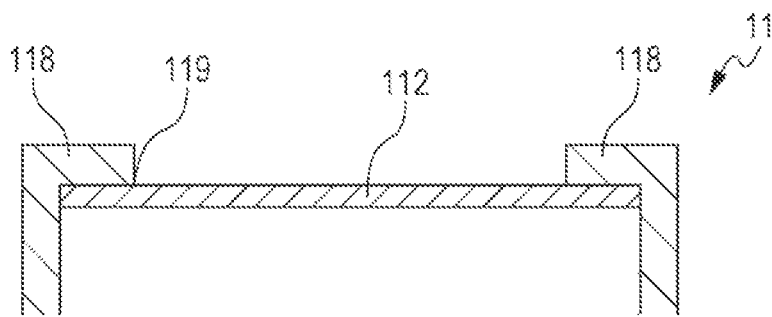
FIG. 6 is a cross-sectional view of a nozzle-forming surface of an ink jet recording apparatus according to an embodiment of the present disclosure.
Figure 7:
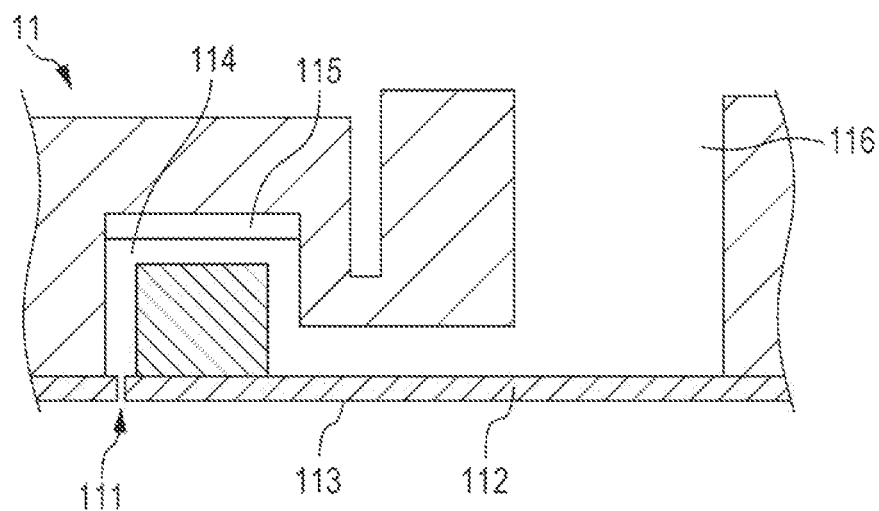
FIG. 7 is a cross-sectional view of an ink jet head according to an embodiment of the present disclosure.
Figure 8:
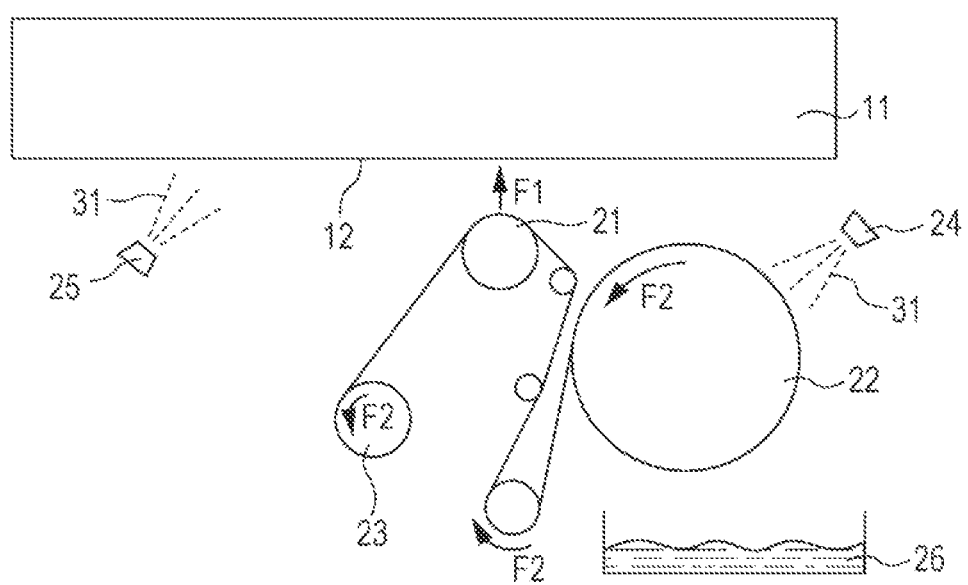
FIG. 8 is a schematic view of a wiping step in a maintenance method according to an embodiment of the present disclosure.
Figure 9:
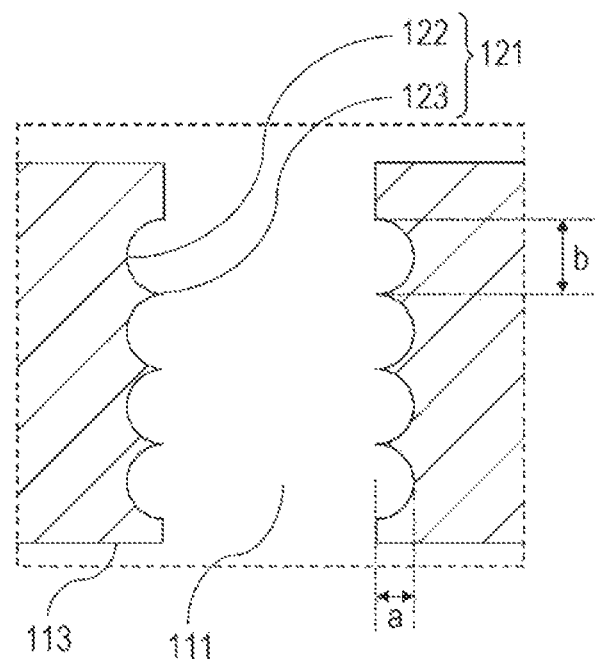
FIG. 9 is a schematic cross-sectional view of a nozzle having a continuous multistep structure on its inner wall.
Figure 10:
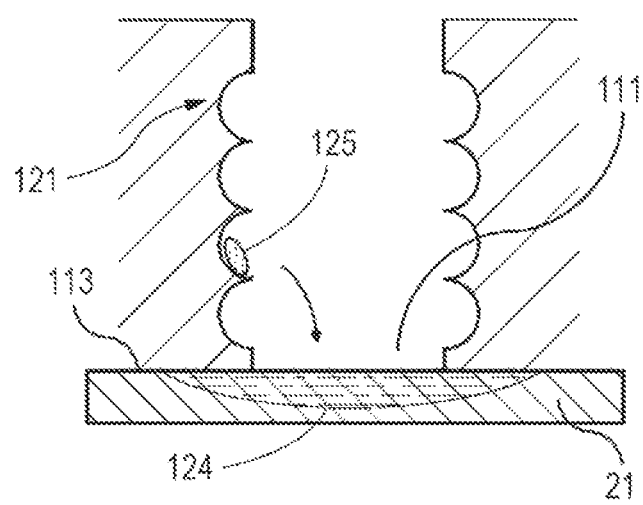
FIG. 10 is a schematic view of the removal of an accumulated material by maintenance from a nozzle having a continuous multistep structure on its inner wall.

FIG. 6 illustrates an example of the step on the nozzle-forming surface. FIG. 6 is a cross-sectional view taken along the line between the upper and lower arrows VI-VI in FIG. 3, viewed from the side with the nozzle-forming surface facing upward.

The fixing plate 118 is fixed to the nozzle-forming surface in the ink jet head 11. The fixing plate 118 has an opening corresponding to the nozzle array 117 and the periphery of the nozzle array 117 so as not to cover the nozzle array 117, but covers the other portion of the nozzle-forming surface 12. Thus, the nozzle array 117 is lower than the portion covered with the fixing plate 118. This can prevent the nozzle array 117 from being damaged when the nozzle-forming surface 12 is rubbed or collides with something. This can protect the nozzle array 117.

The step 119 on the nozzle-forming surface 12 is formed between the portion covered with the fixing plate 118 and the portion not covered with the fixing plate 118. The step on the nozzle-forming surface is not limited to the step of the above example and may be any step in the portion of the nozzle-forming surface wiped by the wiping member. A step may be formed for any purpose.

The ink jet head 11 may have a first nozzle array Col for ejecting the ink composition and a second nozzle array OP for ejecting the treatment liquid. A plurality of first nozzle arrays Col may be provided depending on the type of ink composition to be used. The first nozzle array Col and the second nozzle array OP may be arranged in any way. For example, the first nozzle array Col and the second nozzle array OP may be arranged on the nozzle-forming surface of the ink jet head so as to have an overlapping portion when projected in the main scanning direction S1 or S2 of the ink jet head 11 (FIG. 3). Such an arrangement enables the ejection of the treatment liquid by the second nozzle array OP simultaneously with the ejection of the ink composition by the first nozzle array Col in one region through one main scan. The one region is a region on the recording medium facing both the second nozzle array OP and the first nozzle array Col during one main scan with the second nozzle array OP and the first nozzle array Col.

In an ink jet recording apparatus to be subjected to the maintenance method according to the present embodiment, recording may be performed by a plurality of main scans in each of which the ink composition and the treatment liquid are applied to one region of the recording medium. More specifically, recording may be serially performed as described later through main scanning in which the ink composition and the treatment liquid are applied to one region of the recording medium in one main scan. The length of the first nozzle array Col in the sub-scanning direction can be longer and the recording speed can be faster when the ejection of the treatment liquid and the ejection of the ink composition performed simultaneously in one main scan are performed multiple times than when the ink composition and the treatment liquid are not applied to one region of the recording medium in one main scan, as illustrated in FIG. 4. Alternatively, when the length of the first nozzle array Col in the sub-scanning direction in FIG. 4 is the same as that in FIG. 3 and the recording speed in FIG. 4 is the same as that in FIG. 3, the length of the ink jet head 11 in the sub-scanning direction can be shortened in FIG. 3.

On the other hand, as illustrated in FIG. 3, when main scanning, in which the ink composition and the treatment liquid are applied to one region of the recording medium in one main scan, is performed multiple times for recording, for example, a mist of the treatment liquid and a mist of the ink composition tend to adhere simultaneously to the nozzle-forming surface 12 and form a foreign material. Furthermore, a mist of the treatment liquid floating in the main scanning direction adheres easily to the nozzle-forming surface 12 and easily forms a foreign material. Thus, the present disclosure is particularly useful.

As illustrated in FIG. 4, the first nozzle array Col and the second nozzle array OP may be arranged on the nozzle-forming surface of the ink jet head so as not to have an overlapping portion when projected in the main scanning direction S1 or S2 of the ink jet head 11. More specifically, there is no region on the recording medium facing both the second nozzle array OP and the first nozzle array Col during one main scan with the second nozzle array OP and the first nozzle array Col.

The phrase "so as not to have an overlapping portion" means that the first nozzle array Col itself is not located in the main scanning direction S1 or S2 of the second nozzle array OP or that the first nozzle array Col located in the main scanning direction S1 or S2 of the second nozzle array OP is controlled not to eject the ink composition.

A system that performs main scanning multiple times for recording is referred to as a serial system.

In the serial system, in particular, main scanning and sub-scanning are performed multiple times. During the sub-scanning, the recording medium is transported in the sub-scanning direction crossing the main scanning direction. Main scanning and sub-scanning may be alternately performed multiple times.

In particular, main scanning in which the ink composition and the treatment liquid are applied to one region of the recording medium may be performed multiple times for recording.

The ink jet head used in the serial system is also referred to as a serial head.

In the serial system, the length of the nozzle array for ejecting the ink composition in the sub-scan direction divided by the length of one sub-scan is referred to as the number of passes (the number of scans). When the number of passes is two or more, the ink is applied in one main scan to a region of the recording medium facing the nozzle array and is applied again in another main scan to the region of the recording medium facing the nozzle array. A larger number of passes can result in higher recording resolution and image quality. A larger number of passes, however, results in a larger number of main scans required for recording and a larger amount of mist. Thus, the cleaning performance on the nozzle-forming surface becomes important. The number of passes is 1 or more and may range from 2 to 20, 3 to 15, or 4 to 10.

In a recording method referred to as a line method, an ink jet head fixed to an ink jet recording apparatus has a width equal to or greater than the recording width of a recording medium and ejects ink droplets from a nozzle in synchronization with the transport of the recording medium in the longitudinal direction (transport direction), thereby forming an image on the recording medium. The line system can form an image in one pass. The ink jet head used in the line system is also referred to as a line head.

The maintenance method according to the present embodiment can be used for serial heads and line heads. As described above, the maintenance method according to the present embodiment may be used for serial heads, on which a foreign material is often formed.

In recording with the ink jet recording apparatus, the maximum amount of the ink composition to be applied to a region where the ink composition and the treatment liquid overlap may be 5 mg/inch$^2$ or more, 10 mg/inch$^2$ or more, or 12 mg/inch$^2$ or more. This amount may be 25 mg/inch$^2$ or less, 20 mg/inch$^2$ or less, or 15 mg/inch$^2$ or less. In such a range, useful images with good color development can be recorded, and contamination of the nozzle-forming surface can be reduced due to a small amount of ink required for recording, which is advantageous to cleaning performance.

In recording with the ink jet recording apparatus, in a region where the ink composition and the treatment liquid overlap, the amount of the treatment liquid to be applied to a region to which the maximum amount of the ink composition is applied may be 0.1 mg/inch$^2$ or more, 0.5 mg/inch$^2$ or more, or 1.0 mg/inch$^2$ or more. This amount may be 10 mg/inch$^2$ or less, 5 mg/inch$^2$ or less, 3 mg/inch$^2$ or less, 2 mg/inch$^2$ or less, or 1.5 mg/inch$^2$ or less. Such a range may result in higher image quality and cleaning performance.

Recording with the ink jet recording apparatus may include a primary drying step of immediately drying the ink applied to the recording medium. The primary drying step is performed using a drying mechanism for the primary drying step, and the drying mechanism is a platen heater, a pre-heater, a blower fan, or an IR heater, for example. Drying of the ink is promoted by heating, blowing, or the like.

When the primary drying step is performed or not performed, the surface temperature of the recording medium during ink application may be 45° C. or less, 43° C. or less, or 40° C. or less. The surface temperature may be 25° C. or more, 30° C. or more, or 35° C. or more.

Recording with the ink jet recording apparatus may include a post-drying step (secondary drying step) of completing recording by heating the recording medium to which the ink has been applied. The post-drying step is performed using a drying mechanism for the post-drying step, and the drying mechanism is a conductive heater, a blower fan, or an IR heater, for example. Drying of the ink is promoted by heating, blowing, or the like.

In the post-drying step, the surface temperature of the recording medium may be 120° C. or less, 100° C. or less, or 90° C. or less. The surface temperature may be 60° C. or more, 70° C. or more, or 80° C. or more.

The maintenance method according to the present embodiment may be performed in an ink jet recording apparatus with which recording is performed as described above.

Examples of the material of the nozzle plate 112 include, but are not limited to, silicon and stainless steel (SUS). These materials may be alloys containing another metal.

A water-repellent film (not shown) may be formed on the surface of the nozzle plate 112. In the presence of a water-repellent film, the surface of the water-repellent film is the nozzle-forming surface 12. The water-repellent film may be any film with water repellency and can be formed, for example, by forming a water-repellent metal alkoxide molecular film and then drying and annealing the film. The metal alkoxide molecular film may be any metal alkoxide molecular film with water repellency and may be a metal alkoxide molecular film with a long-chain polymer group containing fluorine (a long-chain RF group) or a metal acid salt monomolecular film with a water-repellent group (for example, a long-chain polymer group containing fluorine). The metal alkoxide is not particularly limited. Examples of the metal species of the metal alkoxide include silicon, titanium, aluminum, and zirconium. Examples of the long-chain RF group include, but are not limited to, perfluoroalkyl chains and perfluoropolyether chains.

Examples of alkoxysilanes with the long-chain RF group include silane coupling agents with the long-chain RF group. Examples of the water-repellent film include, but are not limited to, silane coupling agent (SCA) films and films described in Japanese Patent No. 4,424,954.

1.2.4. Treatment Liquid

The treatment liquid contains a coagulant and may optionally contain water, an organic solvent, an antifoaming agent, a surfactant, and a pH adjuster.

1.2.4.1. Coagulant

Examples of the coagulant include, but are not limited to, polyvalent metal salts, organic acids, and cationic polymers. The coagulant may be water-soluble. With water-soluble coagulants, insoluble residues and cloudiness are not visually observed when the coagulants are added to water at 1% by mass at normal temperature and pressure and are sufficiently stirred.

Examples of the polyvalent metal salts include, but are not limited to, polyvalent metal salts of inorganic acids and polyvalent metal salts of organic acids. Examples of such polyvalent metal salts include, but are not limited to, salts of the group 2 typical metals in the periodic table (for example, magnesium and calcium), the group 3 transition metals in the periodic table (for example, lanthanum), the group 13 typical metals in the periodic table (for example, aluminum), and lanthanides (for example, neodymium). Such polyvalent metal salts may be carboxylates (formates, acetates, benzoates, etc.), sulfates, nitrates, chlorides, and thiocyanates. Examples of such polyvalent metal salts include calcium or magnesium salts of carboxylic acids (formates, acetates, benzoates, etc.), calcium or magnesium salts of sulfuric acid, calcium or magnesium salts of nitric acid, calcium chloride, magnesium chloride, and calcium or magnesium salts of thiocyanic acid.

Examples of the organic acids include, but are not limited to, acids with a carboxy group, such as succinic acid, oxalic acid, malonic acid, citric acid, and acetic acid.

Examples of the cationic polymers include, but are not limited to, amine resins and cationic urethane resins. Examples of the amine resins include polyamine resins, polyamide resins, and polyallylamine resins. The polyamine resins may be any resins having an amino group in the main skeleton of the resins. The polyamide resins may be any resins having an amide group in the main skeleton of the resins and having an amino group. The polyallylamine resins may be resins having a structure derived from allylamine in the main skeleton of the resins, such as polyallylamine and polyallylamine derivatives.

The coagulant content may be 0.5% or more by mass of the total mass of the treatment liquid. The coagulant content may range from 1% to 15% by mass, 2% to 10% by mass, or 3% to 7% by mass. A coagulant content in such a range tends to result in a recorded material with further improved image quality.

1.2.4.2. Water

The treatment liquid may be an aqueous composition. The aqueous composition is a composition containing at least water as a major solvent component of the composition. The water content may be 40% or more by mass or 45% to 99.5% by mass of the total mass of the treatment liquid.

The water content may range from 50% to 90% by mass, 60% to 80% by mass, or 65% to 80% by mass.

1.2.4.3. Organic Solvent

Examples of the organic solvent include, but are not limited to, glycerin; ethylene glycol, diethylene glycol, triethylene glycol, propylene glycol, 1,3-propanediol, 1,2-butanediol, 1,2-pentanediol, 1,2-hexanediol, 1,4-butanediol, 1,5-pentanediol, and 1,6-hexanediol; glycol solvents, such as diethylene glycol mono(di)-propyl ether and ethylene glycol mono(di)-butyl ether; alcohols, such as methanol, ethanol, propyl alcohol, and butanol; and nitrogen-containing solvents, such as 2-pyrrolidone, N-methyl-2-pyrrolidone, and N-ethyl-2-pyrrolidone.

Examples of the nitrogen-containing solvents include cyclic amides and acyclic amides. Examples of the cyclic amides include 2-pyrrolidone described above and pyrrolidones, which are derivatives of pyrrolidone. Examples of the acyclic amides include N,N-dialkylamides. Examples of the N,N-dialkylamides include alkoxy-N,N-dialkylamides with an alkoxy group and N,N-dialkylamides without an alkoxy group. Examples include 3-methoxy-N,N-dimethylpropaneamide, 3-butoxy-N,N-dimethylpropaneamide, and N,N-dimethylpropaneamide.

Examples of the organic solvent include the organic solvents that may be contained in the maintenance liquid, the polyols described above, and alkanediols having five or more carbon atoms.

Among the organic solvents, polyols, alkanediols having five or more carbon atoms, and nitrogen-containing solvents, for example, propylene glycol, 1,2-hexanediol, and 2-pyrrolidone may be used. The organic solvents may be used alone or in combination.

The organic solvent content may range from 5% to 35% by mass, 10% to 30% by mass, or 15% to 25% by mass of the total mass of the treatment liquid.

1.2.4.4. Antifoaming Agent

Examples of the antifoaming agent include, but are not limited to, silicone antifoaming agents, polyether antifoaming agents, fatty acid ester antifoaming agents, and acetylenic glycol antifoaming agents. Examples of commercial products of the antifoaming agent include BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, and BYK-1770 (trade names, manufactured by BYK Japan KK), and Surfynol DF37, DF110D, DF58, DF75, DF220, and MD-20, and EnviroGem ADO1 (trade names, manufactured by Nissin Chemical Industry Co., Ltd.). The antifoaming agents may be used alone or in combination.

The antifoaming agent content may range from 0.01% to 2% by mass, 0.05% to 1% by mass, or 0.05% to 0.5% by mass of the total mass of the treatment liquid.

1.2.4.5. Surfactant

Examples of the surfactant include those exemplified above for the maintenance liquid. The surfactant content may range from 0.1% to 3% by mass, 0.3% to 2% by mass, or 0.5% to 1.5% by mass of the total mass of the treatment liquid.

1.2.4.6. pH Adjuster

Examples of the pH adjuster include those exemplified above for the maintenance liquid. The pH adjuster content may range from 0.01% to 2% by mass, 0.05% to 1% by mass, or 0.05% to 0.5% by mass of the total mass of the treatment liquid.

1.2.5. Ink Composition

Examples of the ink composition include aqueous inks. Examples of components of aqueous inks include coloring materials, water, organic solvents, resins, waxes, antifoaming agents, surfactants, and pH adjusters. The term "aqueous", as used herein, refers to a composition containing water as one of main solvent components.

1.2.5.1. Coloring Materials

Examples of the coloring materials include dyes and pigments. In particular, pigments have good chromaticity and light fastness.

Examples of the pigments include carbon black (C.I. Pigment Black 7), such as furnace black, lampblack, acetylene black, and channel black; inorganic pigments, such as iron oxide and titanium oxide; and organic pigments, such as quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

The coloring material content, such as the pigment content, may be 0.5% or more by mass or 2% or more by mass of the total mass of the ink composition. The coloring material content, such as the pigment content, may range from 2% to 15% by mass, 2% to 10% by mass, or 2% to 7% by mass. A coloring material content, such as a pigment content, of 2% or more by mass makes cleaning difficult due to a relatively large amount of foreign material. Thus, the present disclosure is particularly useful.

1.2.5.2. Water

The water content may be 40% or more by mass or 45% to 99% by mass of the total mass of the ink composition. The water content may range from 55% to 80% by mass, 60% to 75% by mass, or 65% to 70% by mass.

1.2.5.3. Organic Solvent

Examples of the organic solvent include those exemplified above for the treatment liquid and the maintenance liquid. The organic solvent content may be 1% or more by mass of the total mass of the ink composition. The organic solvent content may range from 5% to 35% by mass, 10% to 30% by mass, or 15% to 25% by mass.

1.2.5.4. Resin

The resin may be dissolved in the ink composition or may be dispersed in the form of emulsion (resin particles). The use of the resin tends to provide a recorded material with higher scratch resistance. In particular, the resin tends to contribute to improved binding properties between the recording medium and the ink coating film (scratch resistance) and becomes a component that easily reacts with a coagulant of the treatment liquid described later. Examples of the resin include, but are not limited to, acrylic resins, vinyl acetate resins, vinyl chloride resins, butadiene resins, styrene resins, polyester resins, cross-linked acrylic resins, cross-linked styrene resins, benzoguanamine resins, phenolic resins, silicone resins, epoxy resins, urethane resins, paraffin resins, fluoropolymers, water-soluble resins, and copolymers of monomers constituting these resins. The acrylic resins are produced by polymerizing at least an acrylic monomer and also include acrylic copolymer resins of an acrylic monomer and another monomer. The acrylic monomer is a monomer with a (meth)acrylic group, such as (meth)acrylate or (meth)acrylic acid. Examples of the other monomer include vinyl monomers. Examples of the vinyl monomers include styrene. Examples of the acrylic copolymer resins include styrene acrylic resins.

The resin may be a copolymer. Examples of the copolymer include, but are not limited to, styrene butadiene resins and styrene acrylic resins. The resin may be a polymer latex containing one of these resins. Examples include polymer latexes containing fine particles of an acrylic resin, a styrene acrylic resin, a styrene resin, a cross-linked acrylic resin, or a cross-linked styrene resin. These resins may be used alone or in combination.

Among the resins, acrylic resins, urethane resins, and polyester resins may be used.

The resin content may be 0.5% or more by mass of the total mass of the ink composition. The resin content may range from 1% to 15% by mass, 2% to 12% by mass, or 3% to 10% by mass. A resin content of 1% or more by mass tends to result in a recorded material with further improved scratch resistance. A resin content of 15% or less by mass tends to result in a decreased ink viscosity, high ejection stability, and good clogging recovery.

1.2.5.5. Wax

The wax may be dissolved in the ink composition or may be dispersed in the form of emulsion The use of the wax tends to provide a recorded material with higher scratch resistance. In particular, the wax unevenly distributed on the surface of an ink coating film on the recording medium (the interface between the air and the ink coating film) tends to contribute to improved scratch resistance. Examples of the wax include, but are not limited to, ester waxes of higher fatty acids and higher monohydric or dihydric alcohols (possibly monohydric alcohols), paraffin waxes, olefin waxes, or mixtures thereof.

The wax content may range from 0.1% to 5% by mass, 0.3% to 3% by mass, or 0.5% to 2% by mass of the total mass of the ink composition. A wax content of 0.1% or more by mass tends to result in a recorded material with further improved scratch resistance. A wax content of 5% or less by mass tends to result in a decreased ink viscosity, high ejection stability, and good clogging recovery.

1.2.5.6. Antifoaming Agent

Examples of the antifoaming agent include those exemplified above for the treatment liquid. The antifoaming agent content may range from 0.01% to 2% by mass, 0.05% to 1% by mass, or 0.05% to 0.5% by mass of the total mass of the ink composition.

1.2.5.7. Surfactant

Examples of the surfactant include those exemplified above for the maintenance liquid. The surfactant content may range from 0.1% to 3% by mass, 0.3% to 2% by mass, or 0.5% to 1.5% by mass of the total mass of the ink composition.

1.2.5.8. pH Adjuster

Examples of the pH adjuster include those exemplified above for the maintenance liquid. The pH adjuster content may range from 0.01% to 2% by mass, 0.05% to 1% by mass, or 0.05% to 0.5% by mass of the total mass of the ink composition.

1.3. Recording Medium

Any recording medium may be used in the present embodiment. For example, an absorbent recording medium, a low-absorbent recording medium, or a non-absorbent recording medium may be used. In particular, a low-absorbent or non-absorbent recording medium may be used in a recording method using the treatment liquid. In particular, a non-absorbent recording medium may be used.

Examples of the absorbent recording medium include, but are not limited to, plain paper, such as electrophotographic paper with high ink permeability, and ink jet paper (ink jet paper with an ink-absorbing layer composed of silica particles or alumina particles or with an ink-absorbing layer composed of a hydrophilic polymer, such as poly(vinyl alcohol) (PVA) or polyvinylpyrrolidone (PVP)). Alternatively, a fabric may be used.

Examples of the low-absorbent recording medium include art paper, coated paper, and cast paper with relatively low ink permeability for use in general offset printing. These are also referred to as coated paper, in which a coating layer with relatively low ink permeability is formed on a base material, such as paper. The coating layer is a low-water-absorption layer composed of a resin, an inorganic compound, and the like and is a low-ink-absorption layer.

Examples of the non-absorbent recording medium include, but are not limited to, films and plates made of plastics, such as poly(vinyl chloride), polyethylene, polypropylene, poly(ethylene terephthalate) (PET), polycarbonate, polystyrene, and polyurethane; plates of metals, such as iron, silver, copper, and aluminum; metal plates and plastic films produced by vapor deposition of these metals, and alloy plates of stainless steel and brass; and recording media produced by bonding (coating) a plastic film, such as poly (vinyl chloride), polyethylene, polypropylene, poly(ethylene terephthalate) (PET), polycarbonate, polystyrene, or polyurethane, to a paper base material.

2. Maintenance Liquid

The maintenance liquid according to the present embodiment can be used in the maintenance method described above and contains water that constitutes 80% or more by mass of the total mass of the maintenance liquid. The composition of the maintenance liquid is described above.

3. Ink Jet Recording Apparatus

Figure 5:
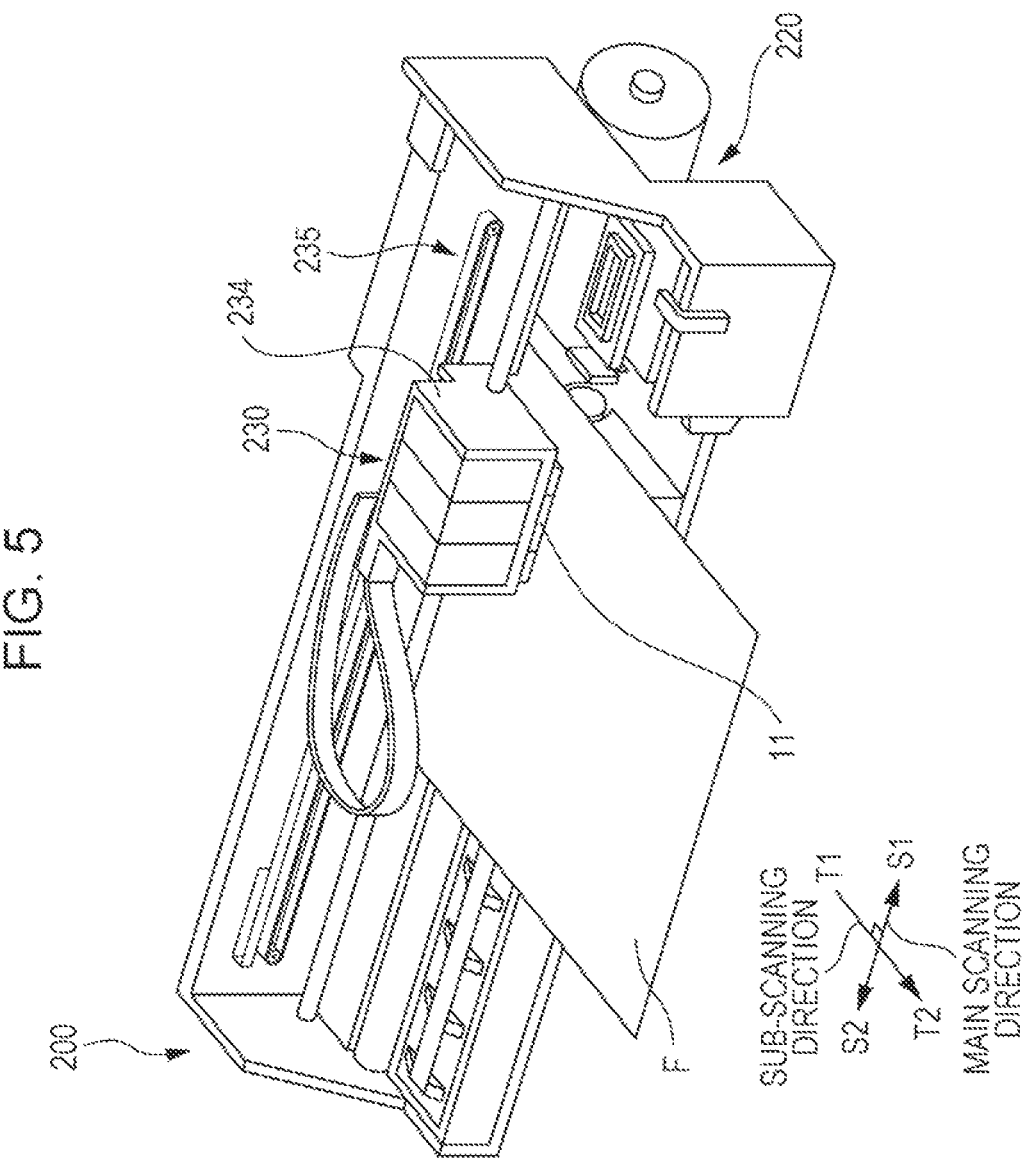
FIG. 5 is a perspective view of an ink jet recording apparatus according to an embodiment of the present disclosure.

FIG. 5 is a perspective view of a serial printer as an example of the ink jet recording apparatus for use in the maintenance method according to the present embodiment. As illustrated in FIG. 5, a serial printer 200 includes a transport unit 220 and a recording unit 230. The transport unit 220 transports a recording medium F fed to the serial printer to the recording unit 230 and ejects the recording medium from the serial printer after recording. More specifically, the transport unit 220 has a feed roller and transports the transported recording medium F in the sub-scanning direction T1 or T2.

The recording unit 230 includes an ink jet head 11 for ejecting a composition onto the recording medium F transported from the transport unit 220, a carriage 234 for mounting the ink jet head 11, and a carriage drive mechanism 235 for moving the carriage 234 in the main scanning direction S1 or S2 of the recording medium F.

The second aspect of the present disclosure is described below. In the description of the second aspect of the present disclosure, FIGS. 7 to 11 are described as FIGS. 1 to 5, respectively.

Although the embodiments of the present disclosure (hereinafter referred to as "the present embodiments") are described in detail below with reference to the accompanying drawings as required, the present disclosure is not limited to these embodiments, and various modifications may be made in these embodiments without departing from the gist of the present disclosure. Like components are denoted by like reference numerals throughout the figures and are not described again. Unless otherwise specified, the positional relationship, such as up, down, left, or right, is based on the positional relationship shown in the drawings. The dimensions of components are not limited to the dimensions shown in the drawings.

1. Maintenance Method

The maintenance method according to the present embodiment can be used for an ink jet recording apparatus for recording on a heated recording medium, wherein the ink jet recording apparatus includes an ink jet head for ejecting an aqueous ink composition from a nozzle having a continuous multistep structure on its inner wall, the maintenance method includes a wiping step of wiping a nozzle surface of the ink jet head with an absorbent wiping member, and the aqueous ink composition contains water and resin particles.

In recent years, an ejection head having a continuous multistep structure on its sidewall has been used to achieve a high array density and multi-nozzle. In a nozzle with such a continuous multistep structure, due to a large surface area inside the nozzle orifice, ink may be dried inside the nozzle orifice when the meniscus is drawn in during ejection, and a solid component in the aqueous ink composition may adhere to the continuous multistep structure and may accumulate gradually. Such accumulation may change the ejection direction or cause ejection failure. In particular, such accumulation is likely to occur in an aqueous ink composition containing a resin. Also while recording on a heated recording medium, the nozzle is heated, and the aqueous ink composition tends to be more quickly dried and accumulate.

In contrast, in the present embodiment, to reduce such accumulation of the aqueous ink composition in the nozzle, the nozzle surface of the ink jet head can be wiped with an absorbent wiping member to remove the aqueous ink composition accumulated on the continuous multistep structure. Furthermore, the maintenance method according to the present embodiment can reduce accumulation in the nozzle and at the same time remove the aqueous ink composition attached (adhered) to the nozzle surface.

It is generally thought that such wiping is performed to clean the nozzle surface and is not related to the removal of the aqueous ink composition accumulated on the continuous multistep structure inside the nozzle. This point is considered as follows. The maintenance method according to the present embodiment involves the use of an absorbent wiping member. The absorbent wiping member absorbs and removes the aqueous ink composition on the nozzle surface and also absorbs the aqueous ink composition in the nozzle. Thus, the absorbent wiping member can also remove the accumulated material in the nozzle. The accumulated material in the nozzle, however, may also be removed by another mechanism.

1.1. Ink Jet Head

An ink jet recording apparatus to be subjected to the maintenance method according to the present embodiment has an ink jet head for ejecting an aqueous ink composition from a nozzle having a continuous multistep structure on its inner wall and performs recording on a heated recording medium. More specifically, such an ink jet recording apparatus ejects ink onto a heated recording medium for recording.

First, an ink jet head with a continuous multistep structure is described below.

FIG. 1 is a cross-sectional view of the ink jet head. The ink jet head 11 includes a nozzle plate 112 having a plurality of nozzle orifices 111 in its surface facing a recording medium (to which ink is to be applied), a pressure chamber 114 communicating with each of the nozzle orifices 111 formed in the nozzle plate 112, a press unit 115 for changing the volume of the pressure chamber 114, and an ink supply chamber 116 for supplying ink to the pressure chamber 114. In the present embodiment, a nozzle surface 12 is a surface including the surface of the nozzle plate 112. A nozzle surface is also referred to as a nozzle-forming surface.

The press unit 115 may be a piezoelectric system that utilizes the drive pressure of a piezoelectric device to eject ink or a thermal system that uses bubbles formed by heating ink to eject the ink. An ink jet head that utilizes the piezoelectric system is also referred to as a piezoelectric head, and an ink jet head that utilizes the thermal system is also referred to as a thermal head.

The nozzle plate 112 includes an array of the nozzle orifices 111 for ejecting ink. To improve the resolution of an aqueous ink composition on a recorded material, it is necessary to arrange the nozzle orifices 111 in the nozzle plate 112 at a high density in a multi-nozzle form. A method of producing such a high-density ink jet head may be a known method of forming through-holes at a high density, for example, by a Bosch process in a silicon wafer in which nozzles are to be formed.

In the Bosch process, etching of a silicon wafer in the thickness direction and protection of the etching sidewall are alternately performed many times to form a through-hole. The through-hole or nozzle formed in this manner has a continuous multistep structure on the inner wall.

FIG. 3 illustrates an example of the continuous multistep structure on the inner wall of the nozzle. Assuming that the nozzle has a cylindrical space, a cross section of the cylinder is viewed from the side. A circular step along the circle of the cylinder is continuously formed on the inner surface of the cylinder in the longitudinal direction of the cylinder.

A continuous multistep structure 121 refers to such recessed and raised portions formed on the nozzle sidewall in a cross section of the nozzle in the direction in which ink passes through the nozzle. For example, such recessed and raised portions have a series of recessed portions 122 and raised portions 123 between the recessed portions 122 on the inner wall. The recessed and raised portions of the continuous multistep structure are enlarged in the figure.

The continuous multistep structure 121 can also be defined by the depth a of each recessed portion and the distance b between adjacent raised portions. In the presence of a plurality of raised portions or recessed portions, the depth a of each recessed portion and the distance b between raised portions can be expressed by the average depth of the recessed portions and the average distance between the raised portions.

The depth a of each recessed portion may be 1.0 µm or less. The depth a of each recessed portion may range from 0.01 to 1.0 µm, 0.015 to 0.5 µm, or 0.02 to 0.3 µm. The depth a of each recessed portion may range from 0.02 to 0.15 µm.

The distance b between adjacent raised portions may be 1.0 µm or less. The distance b between adjacent raised portions may range from 0.3 to 1.0 µm, 0.4 to 0.8 µm, or 0.45 to 0.7 µm. When the depth a of each recessed portion and the distance b between raised portions are in such a range, the aqueous ink composition accumulated on the continuous multistep structure tends to be more easily removed.

The ratio b/a of the distance b between adjacent raised portions of the continuous multistep structure to the depth a of each recessed portion of the continuous multistep structure may range from 1.0 to 25, 1.5 to 20, 2.0 to 15, or 3.0 to 10. A ratio b/a of 1.0 or more results in a small depth a and a long distance b, which tends to make the aqueous ink composition difficult to accumulate on the continuous multistep structure and make it easier to remove the accumulated aqueous ink composition. A ratio b/a of 25 or less makes it easy for the aqueous ink composition to accumulate on the continuous multistep structure and makes the present disclosure particularly useful.

The thickness of a substrate in which a nozzle of the ink jet head is formed, that is, the nozzle plate may be, but is not limited to, 20 µm or more, 20 to 300 µm, 40 to 100 µm, or 45 to 80 µm.

The nozzle diameter may be, but is not limited to, in the range of 5 to 50 µm, 10 to 40 µm, or 15 to 30 µm.

1.2. Heating Mechanism

An ink jet recording apparatus to be subjected to the maintenance method according to the present embodiment may have a heating mechanism for heating a recording medium while recording. Such a heating mechanism may be, but is not limited to, a platen heater, a preheater, an IR heater, or a blower fan (a hot air heater). When a recording medium is heated in the step of applying the ink composition, the recording medium may be heated using the heating mechanism. This can improve image quality.

1.3. Wiping Step

The wiping step includes wiping a nozzle surface of an ink jet head with an absorbent wiping member. The wiping method is not particularly limited. For example, wiping can be performed by pressing the wiping member against the nozzle surface and transferring the wiping member or the nozzle-forming surface such that the wiping member is relatively transferred along the nozzle surface.

FIG. 2 is a schematic cross-sectional view of a wiping member (cloth wiper) brought into contact with a nozzle-forming surface of an ink jet head. In FIG. 2, a wiping member 21 is pushed toward a nozzle-forming surface 12 of an ink jet head 11 in the direction of an arrow F1. FIG. 4 is a schematic view of the removal of an accumulated material by maintenance from a nozzle having a continuous multistep structure on its inner wall. When a nozzle-forming surface 113 is wiped with the absorbent wiping member 21, ink in the nozzle is absorbed by the wiping member 21 and is sucked from the nozzle. At this time, probably due to a force exerted on the accumulated material 125 formed on the inner wall of the nozzle, the accumulated material 125 is discharged together with ink and removed from the nozzle inner wall in the direction of the arrow. In contrast, without wiping with the absorbent wiping member 21, the accumulated material on the nozzle inner wall is not removed, gradually adheres to the nozzle inner wall, and becomes difficult to remove. Thus, the deviation of the landing position may increase gradually. Reference numeral 124 denotes ink absorbed by the wiping member.

The wiping direction may be, but is not limited to, the direction along the nozzle array. This can prevent the nozzle surface 12 from being unexpectedly contaminated by a portion of the wiping member that has already contacted one nozzle array coming into contact with another nozzle array.

The pressing load of the wiping member 21 against the nozzle-forming surface 12 may be 8 gf/cm or more. The pressing load may be 300 gf/cm or less. The pressing load may range from 8 to 300 gf/cm, 15 to 200 gf/cm, or 25 to 100 gf/cm. The pressing load may range from 30 to 50 gf/cm.

A load of 8 gf/cm or more results in good ink wiping performance on the nozzle-forming surface and more effective removal of an accumulated material in the nozzle. A load of 300 gf/cm or less results in a liquid-repellent film with higher preservability formed on the nozzle-forming surface. The term "load", as used herein, refers to a value calculated by dividing the sum of loads applied to the ink jet head 11 by the contact length (that is, the average linear pressure). The contact length is a longitudinal contact length between the ink jet head 11 and the wiping member 21 and also includes a contact length between a nozzle plate cover and the wiping member when they are in contact with each other.

1.3.1. Wiping Member

The wiping member may be any liquid absorbent member, such as a sponge or a fabric, such as a woven fabric or a nonwoven fabric. The term "absorbent", as used herein, refers to the ability to absorb a maintenance liquid, an ink composition, or the like. When the wiping member is a woven fabric or a nonwoven fabric, the constituent fiber may be, but is not limited to, natural fiber, such as cellulose fiber, or synthetic fiber, such as polyester fiber. Among these, natural fibers or cellulose fibers may be used. Polyester fiber and cellulose fiber tend to have high cleaning performance. Furthermore, cellulose fiber swells with water, is soften by the maintenance liquid, and can therefore further reduce the wear of a water-repellent film on the nozzle-forming surface. Furthermore, a foreign material is taken into swollen cellulose fiber, and the cleaning performance tends to be further improved.

The wiping member 21 in FIG. 2, which is a long fabric, is transferred from the first roll 22 before use and is wound by a second roll 23 after use. Thus, the new wiping member 21 before use can come into contact with the nozzle-forming surface 12. Thus, it is possible to prevent the used wiping member 21 from coming into contact with the nozzle-forming surface 12 again and prevent the nozzle-forming surface 12 from being recontaminated with the ink composition that has permeated the used wiping member 21.

1.3.2. Maintenance Liquid

In the wiping step, wiping may be performed with a maintenance liquid. The maintenance liquid may be used by impregnating the wiping member with the maintenance liquid or by applying the maintenance liquid to the nozzle surface. The maintenance liquid may contain any components, for example, water, an organic solvent, and a pH adjuster.

1.3.2.1. Water

The maintenance liquid may be water or an aqueous composition.

The maintenance liquid may contain water that constitutes 50% or more by mass of the total mass. The maintenance liquid may contain water that constitutes 70% or more by mass or 80% or more by mass of the total mass. This tends to improve the permeability of the wiping member, make it easy to take a foreign material into the wiping member, improve the cleaning performance of the nozzle surface, and further improve the removal of an accumulated material in the nozzle. A water content in such a range tends to result in easier redispersion and removal of a solidified component of the aqueous ink composition.

From the above perspective, the water content of the maintenance liquid may be 85% or more by mass, 90% or more by mass, or 95% or more by mass. The water content of the maintenance liquid may be 100% or less by mass, 99% or less by mass, 98.5% or less by mass, or 98% or less by mass. A water content of the maintenance liquid equal to or higher than such a range tends to result in easier taking of a foreign material into the wiping member and higher cleaning performance.

At a water content of the maintenance liquid equal to or lower than such a range, for example, a maintenance liquid containing not more than a predetermined amount of organic solvent tends to more successfully remove a foreign material from the nozzle-forming surface and have higher cleaning performance than a maintenance liquid composed entirely of water.

1.3.2.2. Organic Solvent

From such a perspective, the maintenance liquid may contain an organic solvent. Such an organic solvent tends to further improve the cleaning performance. Examples of the organic solvent include, but are not limited to, water-miscible organic solvents, such as glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol monoethyl ether, methanol, and ethanol. Examples of the organic solvent also include organic solvents that may be contained in an aqueous ink composition described later.

Among the organic solvents, polyols, glycol ethers, and alkanediols having five or more carbon atoms may be particularly used from the above perspective.

The alkanediols having five or more carbon atoms may have 5 to 10 or 6 to 8 carbon atoms. Examples of the alkanediols having five or more carbon atoms, include, but are not limited to, 1,2-pentanediol, 1,5-pentanediol, 1,2-hexanediol, 1,6-hexanediol, 1,2-heptanediol, 2-ethyl-1,3-hexanediol, 2,2-dimethyl-1,3-propanediol, 2,2-dimethyl-1,3-hexanediol, and 3-methyl-1,5-pentanediol. Among these, 1,2-alkanediol, 1,2-pentanediol, or 1,2-hexanediol may be used.

The glycol ethers are etherified products of an alkylene glycol or of a condensation product of an intermolecular condensation between hydroxy groups of alkylene glycols. The number of condensation of the condensation product may range from 2 to 6 or 2 to 4. In the alkylene glycol or a condensation product thereof, the alkylene may be linear or branched and may have 1 to 7 or 2 to 5 carbon atoms. The ethers of the glycol ethers may be alkyl ethers. The number of carbon atoms in the alkyl group of the alkyl ethers may range from 1 to 5 or 1 to 4. The glycol ethers may be glycol monoethers or glycol diethers.

Examples of the glycol ethers include those that may be contained in an ink described later.

Polyols also have high cleaning performance. Examples of the polyols include alkane polyols having four or less carbon atoms or condensation products produced by an intermolecular condensation between hydroxy groups of alkane polyols having four or less carbon atoms. The number of carbon atoms in these may range from 2 to 3. The number of condensation of the condensation products may range from 2 to 4. The polyols have 2 or more hydroxy groups in the molecule and may have 2 to 4 hydroxy groups in the molecule.

The glycol ethers, polyols, and alkanediols having five or more carbon atoms may be used alone or in combination.

The organic solvent content may be 20% or less by mass of the total mass of the maintenance liquid. The lower limit of the organic solvent content is 0% or more by mass, that is, the organic solvent may not be contained. The organic solvent content may range from 0.5% to 20% by mass, 1.0% to 10% by mass, 1.0% to 5.0% by mass, or 1.0% to 3.0% by mass. At an organic solvent content equal to or higher than such a range, the organic solvent tends to permeate and swell or dissolve a foreign material or the like adhered to the nozzle-forming surface or in the nozzle, more easily remove the foreign material, and further improve the cleaning performance. Furthermore, an organic solvent content equal to or lower than such a range tends to result in a smaller decrease in the absorption of the maintenance liquid in the wiping member due to a relative decrease in the water content.

Among the organic solvents, polyols, glycol ethers, and alkanediols having five or more carbon atoms may be used from the above perspective, and the amount of each organic solvent may be in such a range.

In particular, glycol ethers and alkanediols having five or more carbon atoms may be used from the above perspective, and the glycol ether content or the alkanediol content may be in such a range.

1.3.2.3. pH Adjuster

The maintenance liquid may contain a pH adjuster. The pH adjuster can facilitate the adjustment of the pH of the aqueous ink composition. Examples of the pH adjuster include, but are not limited to, inorganic acids (for example, sulfuric acid, hydrochloric acid, nitric acid, etc.), inorganic bases (for example, lithium hydroxide, sodium hydroxide, potassium hydroxide, ammonia, etc.), organic bases (triethanolamine, diethanolamine, monoethanolamine, triisopropanolamine), and organic acids (for example, adipic acid, citric acid, succinic acid, etc.). Among these, organic bases, triethanolamine, and triisopropanolamine may be used. The pH adjusters may be used alone or in combination.

The pH adjuster content may range from 0.01% to 2% by mass, 0.05% to 1% by mass, or 0.05% to 0.5% by mass of the total mass of the maintenance liquid.

1.3.2.4. Surfactant

The maintenance liquid may further contain a surfactant. Examples of the surfactant include, but are not limited to, acetylenic glycol surfactants, fluorinated surfactants, and silicone surfactants.

The acetylenic glycol surfactants are not particularly limited. For example, at least one selected from 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, and alkylene oxide adducts of 2,4-dimethyl-5-decyne-4-ol may be used. Examples of commercial products of the acetylenic glycol surfactants include, but are not limited to, Olfin 104 series and E series, such as Olfin E1010 (trade names, manufactured by Air Products Japan, Inc.), and Surfynol 465 and Surfynol 61 (trade names, manufactured by Nissin Chemical Industry Co., Ltd.). The acetylenic glycol surfactants may be used alone or in combination.

Examples of the fluorinated surfactants include, but are not limited to, perfluoroalkyl sulfonates, perfluoroalkyl carboxylates, perfluoroalkyl phosphates, perfluoroalkyl ethylene oxide adducts, perfluoroalkyl betaines, and perfluoroalkylamine oxide compounds. Examples of commercial products of the fluorinated surfactants include, but are not limited to, S-144 and S-145 (trade names, manufactured by Asahi Glass Co., Ltd.); FC-170C, FC-430, and Fluorad FC-4430 (trade names, manufactured by Sumitomo 3M Ltd.); FSO, FSO-100, FSN, FSN-100, and FS-300 (trade names, manufactured by DuPont); and FT-250 and FT-251 (trade names, manufactured by NEOS Co., Ltd.). The fluorinated surfactants may be used alone or in combination.

Examples of the silicone surfactants include polysiloxane compounds and polyether-modified organosiloxanes. Specific examples of commercial products of the silicone surfactants include, but are not limited to, BYK-306, BYK-307, BYK-333, BYK-341, BYK-345, BYK-346, BYK-347, BYK-348, and BYK-349 (trade names, manufactured by BYK Japan KK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.). The silicone surfactants may be used alone or in combination.

The amount of surfactant, if present, may range from 0.1% to 3.0% by mass of the total mass of the maintenance liquid. The surfactant content may range from 0.1% to 2.0% by mass or 0.3% to 1.0% by mass.

A surfactant in the maintenance liquid decreases the contact angle to the nozzle-forming surface, disadvantageously spreads the maintenance liquid containing a foreign material or the like over the nozzle-forming surface, and may unexpectedly impair the cleaning performance. From such a perspective, the surfactant content may be zero, may be minimized, or may be low. In such a case, the surfactant content may be 3.0% or less by mass, 1.0% or less by mass, 0.5% or less by mass, 0.1% or less by mass, 0.05% or less by mass, or 0.01% or less by mass of the total mass of the maintenance liquid. The lower limit is 0% or more by mass. The lower limit may be below the detection limit.

A component content of a composition being 00% or less by mass of the total mass of the composition is also referred to as a component content of the composition being not more than 00% by mass. This means that the composition may not contain the component or may have a component content that does not exceed 00% by mass.

1.3.2.5. Surface Tension

The surface tension of the maintenance liquid may be 20 mN/m or more or 45 mN/m or more. The surface tension of the maintenance liquid may be 50 mN/m or more, 55 mN/m or more, or 60 mN/m or more. When the surface tension of the maintenance liquid is 20 mN/m or more, a foreign material is taken into droplets of the maintenance liquid and is absorbed by the wiping member. Thus, the cleaning performance tends to be further improved. The surface tension of the maintenance liquid may be 80 mN/m or less, 75 mN/m or less, or 73 mN/m or less. A surface tension of the maintenance liquid being 80 mN/m or less tends to result in an increased wetted area of the nozzle-forming surface per maintenance liquid and further improved cleaning performance.

The surface tension of the maintenance liquid can be adjusted by changing the amount and type of organic solvent contained in the ink composition or by the presence or absence of a surfactant. The surface tension of the maintenance liquid can be measured by a method described in examples.

1.4. Maintenance Liquid Application Step

The maintenance method according to the present embodiment may further include an application step of applying the maintenance liquid to the nozzle surface or the wiping member. The method of applying the maintenance liquid to the nozzle-forming surface or the wiping member may be, but is not limited to, a method of injecting, dropping, or spreading (coating) the maintenance liquid to apply the maintenance liquid to the nozzle-forming surface or the wiping member, or a method of impregnating the wiping member with the maintenance liquid. Thus, the nozzle-forming surface is wiped with the wiping member in the presence of the maintenance liquid.

For example, in FIG. 2, a maintenance liquid 31 can be applied with a first injector 24 to a first roll 22 on which the wiping member 21 before use is wound. Alternatively, the first roll 22 on which the wiping member 21 before use is wound may be dipped into a pool 26 of the maintenance liquid 31 to apply the maintenance liquid 31 to the wiping member 21.

The position at which the maintenance liquid is applied to the wiping member 21 before the wiping member 21 reaches the nozzle-forming surface 12 is not limited to the position in FIG. 2. The maintenance liquid 31 may be applied to the wiping member 21 before use transferred by the first roll 22 in the direction of an arrow F2 at any stage before the wiping member 21 reaches the nozzle-forming surface 12. For example, the position may be closer to the nozzle-forming surface 12. For example, the position may be immediately before a roller for pushing the wiping member 21 in the direction of the arrow F1. The maintenance liquid 31 can be applied to the nozzle-forming surface 12 with a second injector 25.

The maintenance method according to the present embodiment may not include the application step of applying the maintenance liquid to the nozzle-forming surface or the wiping member. In such a case, the maintenance may be performed by using a wiping member to which the maintenance liquid is applied in advance.

The application step of applying the maintenance liquid to the nozzle-forming surface or the wiping member does not necessarily utilize an application mechanism, such as the injectors or pool (dipping unit), and may be appropriately modified. For example, a dropper or a coater can be used as an application mechanism.

In the application step, the amount of maintenance liquid applied is the amount of maintenance liquid applied to the wiping member or the nozzle-forming surface. The application amount is the amount of maintenance liquid used when the maintenance is performed once and the amount of maintenance liquid used per nozzle array for ejecting one (one type of) ink composition.

The amount of maintenance liquid applied may be 0.1 g or more, 0.3 g or more, or 0.5 g or more. The amount of maintenance liquid applied may be 5.0 g or less, 3.0 g or less, or 1.0 g or less. Such a range results in better cleaning performance and reduced waste of the maintenance liquid.

The amount of maintenance liquid applied is the amount of maintenance liquid applied during the wiping step performed once and is the amount of maintenance liquid applied to a nozzle array of one ink.

1.5. Aqueous Ink Composition

An aqueous ink composition used in an ink jet recording apparatus to be subjected to the maintenance method according to the present embodiment contains water and resin particles. If necessary, the aqueous ink composition may contain an organic solvent, a pigment, a wax, an antifoaming agent, a surfactant, and a pH adjuster. The term "aqueous", as used herein, refers to a composition containing water as one of main solvent components. More specifically, the term "aqueous" refers to a composition with a water content of approximately 40% or more by mass of the total mass of the composition. Each component is described in detail below.

1.5.1. Water

The water content may be 40% or more by mass of the total amount of the aqueous ink composition. The water content may range from 40% to 99% by mass, 50% to 90% by mass, 60% to 80% by mass, or 65% to 70% by mass. A water content equal to or higher than such a range tends to result in a decreased amount of emitted volatile organic compounds (VOC) and improved drying characteristics of the aqueous ink composition by blowing.

1.5.2. Resin Particles

The resin particles may be dispersed in the form of emulsion or suspension. The use of the resin particles tend to provide a recorded material with higher scratch resistance. In particular, the resin particles tend to contribute to improved binding properties between the recording medium and the aqueous ink coating film (scratch resistance)

A large number of resin particles in ink, however, tend to result in the formation of an accumulated material on the continuous multistep structure.

Examples of a resin constituting the resin particles include, but are not limited to, acrylic resins, vinyl acetate resins, vinyl chloride resins, butadiene resins, styrene resins, polyester resins, cross-linked acrylic resins, cross-linked styrene resins, benzoguanamine resins, phenolic resins, silicone resins, epoxy resins, urethane resins, paraffin resins, fluoropolymers, water-soluble resins, and copolymers of monomers constituting these resins. Examples of the copolymers include, but are not limited to, styrene butadiene resins and styrene acrylic resins. The resin may be a polymer latex containing one of these resins. Examples include polymer latexes containing fine particles of an acrylic resin, a styrene acrylic resin, a styrene resin, a cross-linked acrylic resin, or a cross-linked styrene resin. These resins may be used alone or in combination. In particular, the resin particles in the aqueous ink composition according to the present embodiment may contain at least one of acrylic resins, urethane resins, and polyester resins.

The acrylic resins are polymers produced by polymerizing at least an acrylic monomer and also include copolymers of an acrylic monomer and another monomer. Examples of the acrylic monomer include (meth)acrylates and (meth)acrylic acids. Examples of the other monomers include vinyl monomers, such as styrene.

The urethane resins are produced by urethane polymerization between a polyisocyanate compound and a polyol compound.

The resin particle content may be 0.5% or more by mass or 1% or more by mass of the total amount of the aqueous ink composition. The resin particle content may be 2.0% or more by mass, 3.0% to 15.0% by mass, 4.0% to 10.0% by mass, or 3.0% to 8.0% by mass. Although a resin content equal to or higher than such a range results in higher scratch resistance, it tends to result in the formation of an accumulated material on the continuous multistep structure, which makes the present disclosure particularly useful. A resin content equal to or lower than such a range results in a smaller deviation of the landing position.

1.5.3. Organic Solvent

Examples of the organic solvent in the aqueous ink composition include, but are not limited to, glycol monoethers, such as ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, 3-methoxy-3-methylbutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, dipropylene glycol monobutyl ether, and tetraethylene glycol monobutyl ether; glycol diethers, such as diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, and tripropylene glycol dimethyl ether; nitrogen-containing solvents, such as 2-pyrrolidone, N-methyl-2-pyrrolidone, and N-ethyl-2-pyrrolidone; glycerin; glycols, such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, and 1,6-hexanediol; and alcohols, such as methanol, ethanol, n-propyl alcohol, iso-propyl alcohol, n-butanol, 2-butanol, tert-butanol, iso-butanol, n-pentanol, 2-pentanol, 3-pentanol, and tert-pentanol.

Examples of the nitrogen-containing solvents include cyclic amides and acyclic amides. Examples of the cyclic amides include the pyrrolidones described above. Examples of the acyclic amides include N,N-dialkyl-alkylamides. Examples of the N,N-dialkyl-alkylamides include N,N-dialkyl-alkoxyalkylamides.

Among the organic solvents, organic solvents that may be contained in the maintenance liquid may be used. Nitrogen-containing solvents, polyols, glycol ethers, and alkanediols having five or more carbon atoms may be used.

Among these, propylene glycol, 2-pyrrolidone, 1,2-hexanediol, and glycerin may be used. The organic solvents may be used alone or in combination.

The organic solvent content may be 1% or more by mass or 1% to 45% by mass of the total amount of the aqueous ink composition. The organic solvent content may range from 10% to 45% by mass, 15% to 40% by mass, or 20% to 35% by mass. A normal boiling point of the organic solvent in such a range tends to result in a smaller deviation of the landing position and improved ejection stability.

The amount of organic solvent with a normal boiling point of more than 280° C. may be not more than 2.0% by mass, not more than 1.0% by mass, not more than 0.5% by mass, or not more than 0.1% by mass of the total amount of the aqueous ink composition. The lower limit of the amount of organic solvent with a normal boiling point of more than 280° C. is 0% or more by mass. Not more than 00% by mass means that the component may or may not be contained, provided that the component content does not exceed 00% by mass.

An organic solvent content in such a range tends to result in an ink with improved drying characteristics and a recorded material with further improved image quality and scratch resistance.

1.5.4. Pigment

Examples of the pigments include, but are not limited to, carbon black (C.I. Pigment Black 7), such as furnace black, lampblack, acetylene black, and channel black; inorganic pigments, such as iron oxide and titanium oxide; and organic pigments, such as quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, magenta pigments, and azo pigments. These pigments may be used alone or in combination.

The pigment content may be 0.5% or more by mass or 0.5% to 20% by mass of the total amount of the aqueous ink composition. The pigment content may be 2.0% or more by mass, 3.0% to 18% by mass, or 5.0% to 10% by mass. A pigment content equal to or lower than such a range tends to result in an aqueous ink composition with slower solidification and further improved ejection stability. A pigment content equal to or higher than such a range tends to result in a recorded material with a higher optical density. The pigment content refers to the solid content. When a pigment in the form of pigment dispersion liquid is mixed with the aqueous ink composition, the pigment content refers to the solid content thereof.

1.5.5. Wax

The wax may be dissolved in the aqueous ink composition or may be dispersed in the form of emulsion.

Examples of the wax include, but are not limited to, ester waxes of higher fatty acids and higher monohydric or dihydric alcohols (possibly monohydric alcohols), paraffin waxes, olefin waxes, or mixtures thereof. Among these, olefin waxes and polyethylene waxes may be used.

The wax content may range from 0.1% to 3.0% by mass, 0.3% to 2.0% by mass, or 0.3% to 1.0% by mass of the total amount of the aqueous ink composition. A wax content of 0.1% or more by mass tends to result in further improved scratch resistance, as described above. A wax content of 3.0% or less by mass tends to result in an ink with a lower viscosity and high ejection stability.

1.5.6. Antifoaming Agent

Examples of the antifoaming agent include, but are not limited to, silicone antifoaming agents, polyether antifoaming agents, fatty acid ester antifoaming agents, and acetylenic glycol antifoaming agents. Examples of commercial products of the antifoaming agent include BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, and BYK-1770 (trade names, manufactured by BYK Japan KK), and Surfynol DF37, DF110D, DF58, DF75, DF220, and MD-20, and EnviroGem AD01 (trade names, manufactured by Nissin Chemical Industry Co., Ltd.). These antifoaming agents may be used alone or in combination.

The antifoaming agent content may range from 0.03% to 0.7% by mass, 0.05% to 0.5% by mass, or 0.08% to 0.3% by mass of the total amount of the aqueous ink composition.

1.5.7. Surfactant

Examples of the surfactant include, but are not limited to, those exemplified above for the maintenance liquid. The surfactant content may range from 0.3% to 3.0% by mass, 0.5% to 2.0% by mass, or 0.8% to 1.5% by mass of the total amount of the aqueous ink composition.

1.5.8. pH Adjuster

The aqueous ink composition may contain a pH adjuster. The pH adjuster can facilitate the adjustment of the pH of the aqueous ink composition.

Examples of the pH adjuster include, but are not limited to, inorganic acids (for example, sulfuric acid, hydrochloric acid, nitric acid, etc.), inorganic bases (for example, lithium hydroxide, sodium hydroxide, potassium hydroxide, ammonia, etc.), organic bases (triethanolamine, diethanolamine, monoethanolamine, tripropanolamine), and organic acids (for example, adipic acid, citric acid, succinic acid, etc.). The pH adjusters may be used alone or in combination.

The pH adjuster content may be 0.1% or less by mass, 0.05% to 0.1% by mass, or 0.01% to 0.1% by mass of the total amount of the aqueous ink composition.

The surface tension of the ink composition may be 15 mN/m or more or 17 to 40 mN/m or more. The surface tension of the ink composition may range from 20 to 30 mN/m or more or 22 to 25 mN/m or more. The surface tension of the maintenance liquid may be higher than that of the ink composition and may be higher by 10 mN/m or more or 20 to 50 mN/m than that of the ink composition. This tends to further improve the cleaning performance. The method of adjusting or measuring the surface tension of ink may be the same as that of the maintenance liquid.

1.6. Heating Step

The recording apparatus according to the present embodiment performs recording by a recording method including a heating step of heating a recording medium in the step of applying an aqueous ink composition to the recording medium. That is, recording is performed by a recording method of applying an aqueous ink composition to a heated recording medium. Ink landed on a recording medium is rapidly heated to accelerate drying. The step of heating a recording medium in the step of applying an ink composition is also referred to as a primary heating step or a primary drying step.

The heating step is not particularly limited and, for example, has the heating function as described above. A platen heater, a hot air heater, an IR heater, or a preheater may be used.

In the step of applying an aqueous ink composition, heating a recording medium promotes the volatilization of a volatile component of the aqueous ink composition applied to the recording medium and tends to further improve the image quality of a recorded material.

The surface temperature of a recording medium in the step of heating the recording medium in the step of applying an aqueous ink composition may be 50° C. or less, 45° C. or less, 40° C. or less, 38° C. or less, 35° C. or less, or 20° C. to 35° C.

The surface temperature of the recording medium may be 15° C. or more, 20° C. or more, 25° C. or more, 30° C. or more, or 32° C. or more.

A temperature equal to or higher than such a range may result in higher image quality. A temperature equal to or lower than such a range may result in a smaller deviation of the ink landing position and higher nozzle surface wiping performance.

The surface temperature of a recording medium is the surface temperature of the recording medium at the position where the ink jet head faces the recording medium while recording and is highest while recording.

The recording method may include a secondary drying step (secondary heating step) of further heating the recording medium to thoroughly dry the ink on the downstream of a platen in the recording medium transport direction after the completion of the ink application step. The surface temperature of the recording medium in the secondary drying step may be 60° C. or more or 70° C. to 120° C.

1.7. Recording Medium

Any recording medium may be used in the present embodiment. For example, an absorbent recording medium, a low-absorbent recording medium, or a non-absorbent recording medium may be used. Among these, a low-absorbent or non-absorbent recording medium may be used. In particular, a non-absorbent recording medium may be used.

Examples of the absorbent recording medium include, but are not limited to, plain paper, such as electrophotographic paper with high ink permeability, and ink jet paper (ink jet paper with an ink-absorbing layer composed of silica particles or alumina particles or with an ink-absorbing layer composed of a hydrophilic polymer, such as poly(vinyl alcohol) (PVA) or polyvinylpyrrolidone (PVP)). Alternatively, a fabric may be used.

Examples of the low-absorbent recording medium include art paper, coated paper, and cast paper with relatively low ink permeability for use in general offset printing. These are also referred to as coated paper, in which a coating layer with relatively low ink permeability is formed on a base material, such as paper. The coating layer is a low-waterabsorption layer composed of a resin, an inorganic compound, and the like and is a low-ink-absorption layer.

Examples of the non-absorbent recording medium include, but are not limited to, films and plates made of plastics, such as poly(vinyl chloride), polyethylene, polypropylene, poly(ethylene terephthalate) (PET), polycarbonate, polystyrene, and polyurethane; plates of metals, such as iron, silver, copper, and aluminum; metal plates and plastic films produced by vapor deposition of these metals, and alloy plates of stainless steel and brass; and recording media produced by bonding (coating) a plastic film, such as poly(vinyl chloride), polyethylene, polypropylene, poly(ethylene terephthalate) (PET), polycarbonate, polystyrene, or polyurethane, to a paper base material.

2. Ink Jet Recording Apparatus

An ink jet recording apparatus according to the present embodiment includes an ink jet head for ejecting an aqueous ink composition containing water and a resin, a wiping mechanism for wiping a nozzle surface of the ink jet head with an absorbent wiping member, and a heating mechanism for heating a recording medium, wherein the ink jet head has a continuous multistep structure on a nozzle inner wall. The maintenance of the recording apparatus is performed by the maintenance method described above.

FIG. 5 is a perspective view of a serial printer as an example of the ink jet recording apparatus for use in the maintenance method according to the present embodiment. As illustrated in FIG. 5, a serial printer 200 includes a transport unit 220 and a recording unit 230. The transport unit 220 transports a recording medium F fed to the serial printer to the recording unit 230 and ejects the recording medium from the serial printer after recording. More specifically, the transport unit 220 has a feed roller and transports the transported recording medium F in the sub-scanning direction T1 or T2.

The recording unit 230 includes an ink jet head 11 for ejecting a composition onto the recording medium F transported from the transport unit 220, a carriage 234 for mounting the ink jet head 11, and a carriage drive mechanism 235 for moving the carriage 234 in the main scanning direction S1 or S2 of the recording medium F.

The ink jet recording apparatus may include a wiping member and a maintenance liquid application mechanism, as illustrated in FIG. 2. In such a case, a control unit (not shown) of the ink jet recording apparatus controls the wiping member and the maintenance liquid application mechanism to perform a wiping step and a maintenance liquid application step.

Although the ink jet recording apparatus in FIG. 5 is a serial printer, the ink jet recording apparatus may be a line printer having a line head as an ink jet head.

EXAMPLES

Examples of the first aspect of the present disclosure are described below. The present disclosure is more specifically described in the following examples and comparative examples. The present disclosure is not limited in any way by these examples.

1.1. Preparation of Ink 1.1.1. Preparation of Pigment Dispersion Liquid 40 parts by mass of a St-Ac acid copolymer (produced by copolymerization of methacrylic acid/butyl acrylate/styrene/hydroxyethyl acrylate at a mass ratio of 25/50/15/10 by mass, weight-average molecular weight: 7000, acid value: 150 mgKOH/g) was added to a mixture of 7 parts by mass of potassium hydroxide, 23 parts by mass of water, and 30 parts by mass of triethylene glycol mono-n-butyl ether. The mixture was heated at 80° C. with stirring to prepare an aqueous resin solution. 20 parts by mass of a pigment (Pigment Blue 15:3), 10 parts by mass of the aqueous resin solution, 10 parts by mass of diethylene glycol, and 60 parts by mass of ion-exchanged water were mixed and were dispersed in a zirconia bead mill to prepare a pigment dispersion liquid.

The components of each composition listed in Table 1 were put into a mixture tank, were mixed and stirred, and were passed through a 5-μm membrane filter to prepare an ink composition of each example. Unless otherwise specified, the values of each component in the examples in the tables are expressed in % by mass. Each value of the pigment dispersion liquid in the tables represents the mass percentage of the pigment solid. Each value of the resin represents the mass percentage of the resin solid.

TABLE 1

| Maintenance liquid | | Maintenance liquid A | Maintenance liquid B | Maintenance liquid C | Maintenance liquid D | Maintenance liquid E | Maintenance liquid F | Maintenance liquid G |
|---|---|---|---|---|---|---|---|---|
| Organic solvent | Propylene glycol | 2.0 | | | 15.0 | 2.0 | 25.0 | 20.0 |
| | 1,2-Hexanediol | | 2.0 | | | | | 2.0 |
| Surfactant | BYK348 | | | | | 0.5 | | |
| pH adjuster | Triethanolamine | 0.1 | 0.1 | 0.1 | 0.1 | 0.1 | 0.1 | 0.1 |
| Pure water | | 97.9 | 97.9 | 99.9 | 84.9 | 97.4 | 74.9 | 77.9 |
| Total | | 100.0 | 100.0 | 100.0 | 100.0 | 100.0 | 100.0 | 100.0 |
| Surface tension (mN/m) | | 66 | 48 | 68 | 58 | 23 | 51 | 45 |
| Contact angle (°) | | 106 | 101 | 108 | 104 | 62 | 102 | 101 |

Abbreviations and components in Table 1 are described below.

[Organic Solvent]

propylene glycol 2-pyrrolidone 1,2-hexanediol

[Pigment Dispersion Liquid]

cyan dispersion liquid (Pigment Blue 15:3)

[Resin]

Joncryl 631 (manufactured by BASF, styrene acrylic resin emulsion)

[Wax]

AQUACER 531 (manufactured by BYK Japan KK, polyethylene wax)

[Antifoaming Agent]
Surfynol DF110D (manufactured by Nissin Chemical Industry Co., Ltd., acetylenic glycol surfactant)

[Surfactant]
BYK-348 (manufactured by BYK Japan KK, silicone surfactant)

[pH Adjuster]
triethanolamine 1.2. Preparation of Treatment Liquid

The components of each composition listed in Table 2 were put into a mixture tank, were mixed and stirred, and were passed through a 5-μm membrane filter to prepare a treatment liquid of each example. Unless otherwise specified, the values of each component in the examples in the tables are expressed in % by mass.

TABLE 2

| Treatment liquid | | Treatment liquid A | Treatment liquid B | Treatment liquid C | Treatment liquid D |
|---|---|---|---|---|---|
| Organic solvent | Propylene glycol | 15.0 | 15.0 | 15.0 | 15.0 |
| | 2-pyrrolidone | 10.0 | 10.0 | 10.0 | 10.0 |
| | 1,2-Hexanediol | 1.0 | 1.0 | 1.0 | 1.0 |
| Coagulant | Calcium acetate monohydrate | 5.0 | | | 8.0 |
| | Malonic acid | | 5.0 | | |
| | Catiomaster PD-7 (solid) | | | 5.0 | |
| Antifoaming agent | Surfynol DF110D | 0.1 | 0.1 | 0.1 | 0.1 |
| Surfactant | BYK348 | 1.0 | 1.0 | 1.0 | 1.0 |
| pH adjuster | Triethanolamine | 0.1 | 0.1 | 0.1 | 0.1 |
| Pure water | | Remainder | Remainder | Remainder | Remainder |
| Total | | 100 | 100 | 100 | 100 |
| Surface tension (mN/m) | | 22 | 22 | 22 | 22 |

Abbreviations and components in Table 2 are described below.

[Organic Solvent]
propylene glycol
2-pyrrolidone
1,2-hexanediol

[Coagulant]
calcium acetate monohydrate
malonic acid
Catiomaster PD-7 (manufactured by Yokkaichi Chemical Co., Ltd., cationic resin: amine-epichlorohydrin condensation polymer)

[Antifoaming Agent]
Surfynol DF110D (manufactured by Nissin Chemical Industry Co., Ltd., acetylenic glycol surfactant)

[Surfactant]
BYK-348 (manufactured by BYK Japan KK, silicone surfactant)

[pH Adjuster]
triethanolamine 1.3. Preparation of Maintenance Liquid

The components of the composition listed in Table 3 were put into a mixture tank, were mixed and stirred, and were passed through a 5-μm membrane filter to prepare a maintenance liquid of each example. Unless otherwise specified, the values of each component in the examples in the tables are expressed in % by mass.

TABLE 3

| Ink composition | | Ink A | Ink B |
|---|---|---|---|
| Organic solvent | Propylene glycol | 10.0 | 10.0 |
| | 2-pyrrolidone | 10.0 | 10.0 |
| | 1,2-Hexanediol | 1.0 | 1.0 |
| Pigment dispersion liquid | Cyan dispersion liquid (pigment solid) | 3.0 | 6.0 |
| Resin | Joncryl 631 (resin solid) | 6.0 | 6.0 |
| Wax | AQUACER531 | 1.0 | 1.0 |
| Antifoaming agent | Surfynol DF110D | 0.1 | 0.1 |
| Surfactant | BYK348 | 1.0 | 1.0 |
| pH adjuster | Triethanolamine | 0.1 | 0.1 |
| Pure water | | Remainder | Remainder |
| Total | | 100 | 100 |
| Surface tension (mN/m) | | 24 | 24 |

Abbreviations and components in Table 3 are described below.

[Organic Solvent]
propylene glycol
1,2-hexanediol

[Surfactant]
BYK-348 (manufactured by BYK Japan KK, silicone surfactant)

[pH Adjuster]
triethanolamine 1.4.1. Surface Tension

The surface tension in Tables 1 to 3 was measured by the Wilhelmy method using an automatic surface tensiometer CBVP-Z (manufactured by Kyowa Interface Science Co., Ltd.). More specifically, a platinum plate was dipped in an ink composition, a treatment liquid, or a maintenance liquid at 25° C., and the force of drawing the platinum plate into the ink was measured.

1.4.2. Contact Angle

The contact angles in Table 3 were the contact angles of the maintenance liquid to a nozzle plate measured with a portable contact angle meter PCA-11 (manufactured by Kyowa Interface Science Co., Ltd.) at 25° C., at a liquid volume of 5 μL, and at an elapsed time of 100 ms.

2. Ink Jet Recording Apparatus

A serial type SC-540650 (manufactured by Seiko Epson Corporation) was modified and used as an ink jet recording apparatus. A heater for drying ink and the like on a recording medium was installed downstream of the ink jet head.

A nozzle plate of the ink jet head was formed of single-crystal silicon. $SiCl_4$ and water vapor were introduced into a chemical vapor deposition (CVD) reactor to form a silicon oxide film ($SiO_2$ film) on a nozzle plate surface. The $SiO_2$ film had a thickness of 50 nm. An oxygen plasma treatment and chemical vapor deposition (CVD) of $C_8F_{17}C_2H_4SiCl_3$ were then performed to form a water-repellent film (thickness: 10 nm) on the $SiO_2$ film, thus producing a silicon nozzle plate with the water-repellent film. The nozzle plate was used in an ink jet head.

Head structures A and B were prepared as ink jet heads. In the head structure A, as illustrated in FIG. 3, the first nozzle array Col and the second nozzle array OP were arranged on the nozzle-forming surface so as to have an overlapping portion when projected in the scanning direction S1 or S2. In the head structure B, as illustrated in FIG. 4, the first nozzle array Col and the second nozzle array OP were arranged on the nozzle-forming surface so as not to have an overlapping portion when projected in the scanning direction S1 or S2. The head structures A and B included a piezoelectric head.

In the head structures A and B, the fixing plate was fixed, and, as illustrated in FIG. 6, a step was formed between the nozzle plate and the fixing plate on the nozzle-forming surface. Thus, the nozzle-forming surface had a step.

A head structure A' was also prepared. The head structure A' had no fixing plate and no step on the nozzle-forming surface. Except for this, the head structure A' was the same as the head structure A.

In any of the head structures, in FIG. 3 or 4, the treatment liquid was ejected from the nozzle array No. 1, and the ink composition was ejected from the nozzle array No. 2. The nozzle arrays used for recording were one nozzle array for the ink composition and one nozzle array for the treatment liquid.

The ink jet recording apparatus had a wiping mechanism, as illustrated in FIG. 1. A wiping member in the wiping mechanism was a fabric made of cellulose fiber (product name "Bemliese", manufactured by Asahi Kasei Corporation) (wiper type W1) or a fabric made of polyester fiber (product name "Toraysee MK", manufactured by Toray Industries, Inc.) (wiper type W2).

The ink jet head and the wiping member were combined in the following tests. The recording conditions for solid images included recording resolution: 720×1440 dpi, print pattern: solid image (cyan alone), number of ink scans: 8, printing temperature: 40° C., secondary drying temperature in drying heater: 90° C., and recording medium: Orajet-3169G (model number, poly(vinyl chloride) film, Orafol Japan Inc.). The application amount is listed in Table 4. The printing temperature and the secondary drying temperature were determined by measuring the temperature of the recording medium with a thermocouple.

The printing temperature was the surface temperature of a portion of the recording medium facing the head. The secondary drying temperature was the surface temperature of a portion of the recording medium that was heated with the drying heater. The printing temperature and the secondary drying temperature were the maximum temperatures.

3. Evaluation Method

3.1. Cleaning Performance

The ink jet recording apparatus was filled with the ink composition and the treatment liquid, and a solid image was continuously printed for two hours under the recording conditions described above. The nozzle-forming surface of the ink jet head after printing was wiped in the sub-scanning direction T1 with a wiper sprayed with a maintenance liquid. Table 4 shows the type and amount of maintenance liquid applied. The application amount is an amount per ink (per nozzle array).

After the wiping, the removal of the ink or the foreign material from the nozzle-forming surface was visually inspected to evaluate the cleaning performance. The evaluation criteria are described below.

Evaluation Criteria

AA: Wiping once can achieve sufficient removal, and no ink is observed on the nozzle-forming surface.

A: Although wiping once leaves a little residue, wiping twice can achieve complete removal.

B: Even wiping twice cannot achieve complete removal, and a little ink is observed on the nozzle-forming surface.

C: Even wiping twice cannot achieve sufficient removal, and the ink is clearly observed on the nozzle-forming surface.

3.2. Wear Resistance of Nozzle-Forming Surface

The ink jet recording apparatus was filled with the ink composition and the treatment liquid, and a solid image was continuously printed for one hour under the recording conditions described above. The nozzle-forming surface of the ink jet head after printing was wiped in the sub-scanning direction T1 with a wiper sprayed with a maintenance liquid. This cycle of printing and wiping was repeated 60,000 times, and then the state of the water-repellent film near the nozzle was examined with an optical microscope (a high-precision non-contact depth measuring microscope "HISOMET II" DH2 manufactured by Union Optical Co., Ltd.). The flight deviation of the ink jet head after the test was also examined.

The effects of the maintenance method on the wear resistance of the nozzle-forming surface were evaluated from these results. The evaluation criteria are described below.

Evaluation Criteria

AA: Peeling of the water-repellent film is not observed.

A: Although some peeling of the water-repellent film is observed, there is no flight deviation after the test.

B: Some peeling of the water-repellent film is observed, and a flight deviation is observed after the test.

C: Considerable peeling of the water-repellent film is observed.

3.3. Solid Image Quality

The ink jet recording apparatus was filled with the ink composition and the treatment liquid, and a solid image was continuously printed for two hours under the recording conditions described above. The solid image was visually inspected, and the image quality was evaluated in accordance with the following evaluation criteria.

Evaluation Criteria

A: There is no region in the solid image where the ink composition is not uniform and appears to be light and dark.

B: Although there is a little region in the solid image where the ink composition is not uniform and appears to be light and dark, it presents no practical problem.

C: There is a large number of regions in the solid image where the ink composition is not uniform and appears to be light and dark.

TABLE 4

|  |  | Example | | | | | | | |
|---|---|---|---|---|---|---|---|---|---|
|  |  | 1 | 2 | 3 | 4 | 5 | 6 | 7 | 8 |
| Maintenance liquid | Type | Maintenance liquid A | Maintenance liquid B | Maintenance liquid C | Maintenance liquid D | Maintenance liquid E | Maintenance liquid A | Maintenance liquid A | Maintenance liquid A |
|  | Amount of applied (g) | 0.7 | 0.7 | 0.7 | 0.7 | 0.7 | 0.7 | 0.7 | 0.7 |
| Treatment liquid | Type | Treatment liquid A | Treatment liquid A | Treatment liquid A | Treatment liquid A | Treatment liquid A | Treatment liquid B | Treatment liquid C | Treatment liquid D |
|  | Amount of applied (mg/inch$^2$) | 1.2 | 1.2 | 1.2 | 1.2 | 1.2 | 1.2 | 1.2 | 1.2 |
| Ink | Type | Ink A | Ink A | Ink A | Ink A | Ink A | Ink A | Ink A | Ink A |
|  | Amount of applied (mg/inch$^2$) | 12 | 12 | 12 | 12 | 12 | 12 | 12 | 12 |
| Type of wiper |  | W1 | W1 | W1 | W1 | W1 | W1 | W1 | W1 |
| Structure of head |  | Structure A | Structure A | Structure A | Structure A | Structure A | Structure A | Structure A | Structure A |
| Step on nozzle-forming surface |  | Yes | Yes | Yes | Yes | Yes | Yes | Yes | Yes |
| Rating | Cleaning performance | AA | AA | A | B | A | AA | A | A |
|  | Wear resistance of nozzle surface | AA | AA | AA | B | AA | AA | A | A |
|  | Solid image quality | B | B | B | B | B | B | A | A |

|  |  | Example | | | | | | | |
|---|---|---|---|---|---|---|---|---|---|
|  |  | 9 | 10 | 11 | 12 | 13 | 14 | 15 | 16 |
| Maintenance liquid | Type | Maintenance liquid B | Maintenance liquid A | Maintenance liquid A | Maintenance liquid A | Maintenance liquid A | Maintenance liquid A | Maintenance liquid A | Maintenance liquid A |
|  | Amount of applied (g) | 0.7 | 0.7 | 0.7 | 0.7 | 0.7 | 0.35 | 0.7 | 0.7 |
| Treatment liquid | Type | Treatment liquid C | Treatment liquid C | Treatment liquid C | Treatment liquid A | Treatment liquid B | Treatment liquid A | Treatment liquid A | Treatment liquid C |
|  | Amount of applied (mg/inch$^2$) | 1.2 | 1.2 | 1.2 | 2.4 | 2.4 | 1.2 | 1.2 | 1.2 |
| Ink | Type | Ink A | Ink B | Ink A | Ink B | Ink B | Ink A | Ink A | Ink A |
|  | Amount of applied (mg/inch$^2$) | 12 | 12 | 12 | 12 | 12 | 12 | 12 | 12 |
| Type of wiper |  | W1 | W1 | W1 | W1 | W1 | W1 | W2 | W1 |
| Structure of head |  | Structure A | Structure A | Structure B | Structure A | Structure A | Structure A | Structure A | Structure A |
| Step on nozzle-forming surface |  | Yes | Yes | Yes | Yes | Yes | Yes | Yes | None |
| Rating | Cleaning performance | AA | B | AA | A | AA | B | A | AA |
|  | Wear resistance of nozzle surface | AA | A | AA | B | AA | A | B | AA |
|  | Solid image quality | A | A | AA | A | B | B | B | A |

|  |  | Example | Comparative example | | | | |
|---|---|---|---|---|---|---|---|
|  |  | 17 | 1 | 2 | 3 | 4 | 5 |
| Maintenance liquid | Type | Maintenance liquid A | Maintenance liquid F | Maintenance liquid G | Maintenance liquid A | Maintenance liquid F | Maintenance liquid D |
|  | Amount of applied (g) | 0.7 | 0.7 | 0.7 | 0.7 | 0.7 | 0.7 |
| Treatment liquid | Type | Treatment liquid C | Treatment liquid A | Treatment liquid A | — | — | — |
|  | Amount of applied (mg/inch$^2$) | 0.7 | 1.2 | 1.2 | — | — | — |

TABLE 4-continued

| Ink | Type | Ink A | Ink A | Ink A | Ink A | Ink A | Ink A |
|---|---|---|---|---|---|---|---|
| | Amount of applied (mg/inch$^2$) | 7 | 12 | 12 | 12 | 12 | 12 |
| | Type of wiper | W1 | W1 | W1 | W1 | W1 | W1 |
| | Structure of head | Structure A | Structure A | Structure A | Structure A | Structure A | Structure A |
| | Step on nozzle-forming surface | Yes | Yes | Yes | Yes | Yes | Yes |
| Rating | Cleaning performance | AA | C | C | AA | A | A |
| | Wear resistance of nozzle surface | AA | C | C | AA | B | A |
| | Solid image quality | A | B | B | C | C | C |

4. Evaluation Results

Table 4 shows the structure of the ink jet recording apparatus as well as the conditions of the ink composition, the treatment liquid, and the maintenance liquid used in each example, together with the evaluation results.

The examples in which recording was performed with the ink and the treatment liquid and the maintenance liquid had a water content of 80% or more by mass showed high cleaning performance and image quality.

In contrast, the comparative examples showed poor cleaning performance or image quality. Details are described below.

A comparison of Examples 1 and 3 shows that the maintenance liquid containing the organic solvent had higher cleaning performance. A comparison of Examples 1 and 4 shows that a lower organic solvent content resulted in higher cleaning performance and wear resistance of the nozzle surface. This is probably because a foreign material adhered to the nozzle-forming surface is difficult to wipe away without the organic solvent, and, in contrast, an excess organic solvent results in a low water content and relatively low cleaning performance and wear resistance of the nozzle surface.

A comparison of Examples 1 and 5 shows that no surfactant and a higher surface tension or contact angle result in higher cleaning performance.

A comparison of Examples 7 and 9 shows that the alkanediol having five or more carbon atoms contained as the organic solvent in the maintenance liquid had higher cleaning performance.

A comparison of Examples 1, 6 to 8, 10, 12, 13, and 17 shows that the cleaning performance and the wear resistance of the nozzle surface are affected by the type and amount of coagulant and the amount of pigment, in other words, by the intensity of aggregation action and by an aggregate of an ink component. The use of the treatment liquid aimed to improve the cleaning performance and the wear resistance of the nozzle surface, which was achieved by the examples.

A comparison of Examples 7 and 11 shows that the first nozzle array Col, which does not overlap the second nozzle array OP in the main scanning direction in the head structure B, is less susceptible to the influence of the ejection of the treatment liquid, which results in high cleaning performance, high wear resistance of the nozzle surface, and high solid image quality.

A comparison of Examples 1 and 15 shows that the wiper W2 made of cellulose fiber could be used as the wiping member to improve the cleaning performance and the wear resistance of the nozzle surface. A comparison of Examples 7 and 16 shows that no step on the nozzle-forming surface resulted in higher cleaning performance and wear resistance of the nozzle surface.

A comparison of Examples 7 and 16 shows that the head without the step on the nozzle-forming surface had higher cleaning performance. The nozzle array portion on the nozzle-forming surface in the head with the step tended to be protected from rubbing or collision with another object. The maintenance method was useful in that even the head with the step could have high cleaning performance.

Comparative Examples 1 and 2, which had a water content of less than 80% by mass, had poor cleaning performance. Furthermore, an ink aggregate that could not be absorbed with the wiping member tended to remain on the nozzle-forming surface, and the wear resistance of the nozzle surface was also poor.

Comparative Examples 3 to 5 had low image quality without the treatment liquid. A comparison of Comparative Example 5 and Example 4 showed that the cleaning performance and the wear resistance of the nozzle surface were higher when the treatment liquid was not used than when the treatment liquid was used. It was found that an aggregate formed by aggregation of an ink component caused by the treatment liquid impaired the cleaning performance and the wear resistance of the nozzle surface.

Examples of the second aspect of the present disclosure are described below. In the description of the examples of the second aspect of the present disclosure, Tables 5 to 8 are described as Tables 1 to 4, respectively.

The present disclosure is more specifically described in the following examples and comparative examples. The present disclosure is not limited in any way by these examples.

1. Preparation of Aqueous Ink Composition
1.1. Preparation of Pigment Dispersion Liquid 40 parts by mass of a St-Ac acid copolymer (produced by copolymerization of methacrylic acid/butyl acrylate/styrene/hydroxyethyl acrylate at a mass ratio of 25/50/15/10 by mass, weight-average molecular weight: 7000, acid value: 150 mgKOH/g) was added to a mixture of 7 parts by mass of potassium hydroxide and 53 parts by mass of water. The mixture was heated at 80° C. with stirring to prepare an aqueous resin solution. 20 parts by mass of a pigment (PB 15:3), 10 parts by mass of the aqueous resin solution, and 70 parts by mass of ion-exchanged water were mixed and were dispersed in a zirconia bead mill to prepare a pigment dispersion liquid.

The components of the composition listed in Table 1 were put into a mixture tank, were mixed and stirred, and were passed through a 5-μm membrane filter to prepare an aqueous ink composition of each example. Unless otherwise specified, the values of each component in the examples in the tables are expressed in % by mass. Each value of the pigment dispersion liquid in the tables represents the mass percentage of the solid.

TABLE 5

| | | Aqueous ink composition | | | | | |
|---|---|---|---|---|---|---|---|
| | | Ink A | Ink B | Ink C | Ink D | Ink E | Ink F |
| Organic solvent | Propylene glycol | 10.0 | 10.0 | 10.0 | 10.0 | 10.0 | 8.0 |
| | 2-pyrrolidone | 10.0 | 10.0 | 10.0 | 10.0 | 10.0 | 10.0 |
| | 1,2-Hexanediol | 1.0 | 1.0 | 1.0 | 1.0 | 1.0 | 1.0 |
| | Glycerin | — | — | — | — | — | 2.0 |
| Pigment dispersion liquid | Cyan dispersion liquid (pigment solid) | 3.0 | 3.0 | 3.0 | 3.0 | 5.0 | 3.0 |
| Resin particles | Acrylic (Joncryl 631) | 6.0 | 3.0 | 8.0 | — | 6.0 | 6.0 |
| | Urethane (Takelac W-6010) | — | — | — | 6.0 | — | — |
| Wax | AQUACER531 | 1.0 | 1.0 | 1.0 | 1.0 | 1.0 | 1.0 |
| Antifoaming agent | Surfynol DF110D | 0.1 | 0.1 | 0.1 | 0.1 | 0.1 | 0.1 |
| Surfactant | BYK348 | 1.0 | 1.0 | 1.0 | 1.0 | 1.0 | 1.0 |
| pH adjuster | Triethanolamine | 0.1 | 0.1 | 0.1 | 0.1 | 0.1 | 0.1 |
| Pure water | | Remainder | Remainder | Remainder | Remainder | Remainder | Remainder |
| Total | | 100.0 | 100.0 | 100.0 | 100.0 | 100.0 | 100.0 |

Abbreviations and components in Table 1 are described below.
[Organic Solvent]
propylene glycol (boiling point 188° C.)
2-pyrrolidone (boiling point 245° C.)
1,2-hexanediol (boiling point 223° C.)
glycerin (boiling point 290° C.)
[Pigment Dispersion Liquid]
PB15:3
[Resin Particles]
Joncryl 631 (acrylic resin particles, BASF Japan Ltd.)
Takelac W-6010 (urethane resin particles, Mitsui Chemicals, Inc.)
[Wax]
Aquacer 539 (polyethylene wax, BYK Japan KK) [Antifoaming Agent]
Surfynol DF110D (acetylenic glycol surfactant, Nissin Chemical Industry Co., Ltd.)
[Surfactant]
BYK348 (silicone surfactant, BYK Japan KK)
[pH Adjuster]
triethanolamine 1.2. Preparation of Maintenance Liquid The components of the composition listed in Table 2 were put into a mixture tank, were mixed and stirred, and were passed through a 5-μm membrane filter to prepare a maintenance liquid of each example.

Abbreviations and components in Table 2 are described below.
[Organic Solvent]
propylene glycol
1,2-hexanediol
3-methoxy-3-methylbutanol
[Surfactant]
BYK348 (silicone surfactant, BYK Japan KK)
[pH Adjuster]
triethanolamine 1.3. Surface Tension The surface tension in Table 1 was measured by the Wilhelmy method using an automatic surface tensiometer CBVP-Z (manufactured by Kyowa Interface Science Co., Ltd.). More specifically, a platinum plate was dipped in an ink composition or a maintenance liquid at 25° C., and the force of drawing the platinum plate into the ink was measured. The surface tension of each ink in Table 1, which was measured in the same manner, was 24.0 mN/m.

2. Ink Jet Recording Apparatus

A serial type SC-540650 (manufactured by Seiko Epson Corporation) was modified and used as an ink jet recording apparatus. A secondary drying heater for drying ink and the like on a recording medium was installed downstream of the ink jet head.

A nozzle plate, which is a silicon substrate, was dry-etched in multiple stages by the Bosch process to form a

TABLE 6

| | | Maintenance liquid | | | | | | | |
|---|---|---|---|---|---|---|---|---|---|
| | | Maintenance liquid A | Maintenance liquid B | Maintenance liquid C | Maintenance liquid D | Maintenance liquid E | Maintenance liquid F | Maintenance liquid G | Maintenance liquid H |
| Organic solvent | Propylene glycol | — | — | 2.0 | — | 15.0 | 2.0 | 19.0 | 17.0 |
| | 1,2-Hexanediol | 2.0 | — | — | — | — | — | — | 2.0 |
| | 3-methoxy-3-methylbutanol | — | 2.0 | — | — | — | — | — | — |
| Surfactant | BYK348 | — | — | — | — | — | 0.5 | — | — |
| pH adjuster | Triethanolamine | 0.1 | 0.1 | 0.1 | 0.1 | 0.1 | 0.1 | 0.1 | 0.1 |
| Pure water | | 97.9 | 97.9 | 97.9 | 99.9 | 84.9 | 97.4 | 80.9 | 80.9 |
| Total | | 100.0 | 100.0 | 100.0 | 100.0 | 100.0 | 100.0 | 100.0 | 100.0 |
| Surface tension (mN/m) | | 48.0 | 53.0 | 66.0 | 68.0 | 58.0 | 23.0 | 51.0 | 45.0 | continuous multistep structure and was used in the ink jet head. Ink jet heads with different b/a ratios were prepared. The ratio b/a is the ratio of the distance b between adjacent raised portions to the depth a of each recessed portion. Table 3 shows the ratio b/a. The a and b of each ink jet head are described below. Each ink jet head had a nozzle plate thickness of 50 μm and a nozzle diameter of approximately 20 μm.

TABLE 7

| Ratio b/a | a | b |
|---|---|---|
| 3 | 0.15 μm | 0.45 μm |
| 5 | 0.1 μm | 0.5 μm |
| 9 | 0.06 μm | 0.54 μm |

An ink jet head without the continuous multistep structure was used in Reference Examples 2 to 5. "Non-scallop 1" in Reference Examples 2 and 4 refers to an ink jet head with a nozzle that was formed by punching a hole in a stainless steel nozzle plate and had no scallop shape. "Non-scallop 2" in Reference Examples 3 and 5 refers to an ink jet head with a nozzle formed in the same manner as the non-scallop 1, wherein the diameter of the punched hole in the nozzle was changed to form a single step of 0.2 μm in the nozzle diameter direction at approximately the center of the nozzle sidewall in the nozzle plate thickness direction, and the nozzle had no scallop shape.

In Table 4, cloth wipers W1 and W2 were used as absorbent wiping members in the maintenance method.

W1: type of cloth Bemliese (cellulose fiber, Asahi Kasei Corporation).

W2: type of cloth Toraysee (polyester fiber, Toray Industries, Inc.).

A rubber wiper made of silicone rubber was prepared as a non-absorbent wiping member. Other maintenance methods in the table are as follows:

Rubber wiper: wiping with a rubber wiper.
FL+rubber wiper: flushing followed by wiping with a rubber wiper.
Suction+rubber wiper: suction followed by wiping with a rubber wiper.

In flushing, 1,000 ink droplets per nozzle were ejected from the nozzle array to an ink receiver. In suction, 2 g of the ink was sucked and discharged from the nozzle array.

In wiping with each wiping member, the nozzle surface was wiped once in a direction perpendicular to the direction of the nozzle array.

In Table 4, when the maintenance liquid was used in the wiping step, the amount of maintenance liquid applied (g) was expressed as the amount per ink (per nozzle array).

A recording test was performed as described below.

The ink jet recording apparatus was filled with the aqueous ink composition, and a solid pattern was recorded on a recording medium. The recording conditions in each example were shown in Table 4. The recording resolution of the solid pattern was 720×1440 dpi, the amount of applied ink was 12 mg/inch$^2$, the number of scans was 8, and the recording medium was Orajet-3169G (model number, poly(vinyl chloride) film, Orafol Japan Inc.).

In examples including the primary heating step, the recording medium was heated with a platen heater, and the surface temperature of the recording medium in the ink application step was shown in the table. The secondary drying temperature of a secondary heater after the ink application step was 90° C. The recording medium surface temperature in each step was determined by measuring the temperature of the recording medium with a thermocouple.

3. Evaluation Method 3.1. Deviation of Landing Position of Aqueous Ink Composition Recording was continuously performed for two hours under the conditions of the recording test. Subsequently, maintenance was performed to wipe the nozzle surface with a wiping member under the conditions described in Table 4. This cycle of recording and maintenance was repeated. The cycle was repeated for a total recording time of 100 hours. Recording and maintenance were completed in this way. The deviation of the landing position was examined by comparing an initial nozzle check pattern prepared before recording with a nozzle check pattern prepared after 100 hours of recording. Before the nozzle check patterns were prepared, the nozzle surface was wiped clean to completely remove the ink composition, thereby eliminating the influence of flight deviation due to contamination of the nozzle surface.

Evaluation Criteria

AA: Deviation of less than one-third of the distance between nozzles is observed.

A: Deviation of one-third or more and less than two-thirds of the distance between nozzles is observed.

B: Deviation of two-thirds or more and less than three-thirds of the distance between nozzles is observed.

C: Deviation of three-thirds or more of the distance between nozzles is observed.

3.2. Solid Image Quality

A solid image was printed on the recording medium under the conditions of the recording test. The printing conditions are shown in Table 4. The image quality was visually inspected, and the solid image quality was determined in accordance with the following evaluation criteria.

Evaluation Criteria

AA: The ink is uniform in the pattern, and variations in density are not observed.

A: Some variations in density are observed.

B: Some variations in density are observed, and the edge of the pattern is slightly nonlinear.

C: The edge of the pattern is highly nonlinear.

3.3. Wiping Performance

A solid image was continuously printed on the recording medium for two hours under the conditions of the recording test. Maintenance was then performed under the conditions shown in Table 4. After the maintenance, the wiping performance on the nozzle surface was visually inspected.

Evaluation Criteria

AA: No ink is observed on the nozzle surface.

A: Although no ink is observed on the nozzle surface, a solid component of the aqueous ink composition is observed with a magnifier.

B: Some residual ink is observed on the nozzle surface.

C: Considerable residual ink is observed on the nozzle surface.

3.4. Scratch Resistance

A solid image was printed on the recording medium under the conditions of the recording test. The printing conditions are shown in Table 4. The solid image was left at room temperature for 30 minutes, and then the solid image printed area was cut into a 30×150 mm rectangle. The recorded surface of the sample was rubbed 30 times with a plain weave fabric in a Gakushin-type rubbing fastness tester (load: 500 g) and was visually inspected for the peeling of the ink. The scratch resistance was evaluated in accordance with the following evaluation criteria.

Evaluation Criteria

AA: No ink is transferred to the plain weave fabric, and the ink coating film does not peel off.

A: Although the ink is partially transferred to the plain weave fabric, the ink coating film does not peel off.

B: The ink is partially transferred to the plain weave fabric, and the ink coating film peels off slightly.

C: The ink coating film peels off significantly, or the base material itself is broken.

TABLE 8

| | Example | | | | | | | |
|---|---|---|---|---|---|---|---|---|
| | 1 | 2 | 3 | 4 | 5 | 6 | 7 | 8 |
| Structure of head (scallop b/a) | 5 | 5 | 5 | 5 | 5 | 5 | 5 | 5 |
| Maintenance method | W1 | W1 | W1 | W1 | W1 | W1 | W1 | W1 |
| Primary heating step | Yes | Yes | Yes | Yes | Yes | Yes | Yes | Yes |
| Surface temperature of recording medium (° C.) | 35 | 35 | 35 | 35 | 35 | 35 | 30 | 40 |
| Type of aqueous ink composition | Ink A | Ink B | Ink C | Ink D | Ink E | Ink F | Ink A | Ink A |
| Type of maintenance liquid | Maintenance liquid A | Maintenance liquid A | Maintenance liquid A | Maintenance liquid A | Maintenance liquid A | Maintenance liquid A | Maintenance liquid A | Maintenance liquid A |
| Amount of maintenance liquid applied (g) | 0.7 | 0.7 | 0.7 | 0.7 | 0.7 | 0.7 | 0.7 | 0.7 |
| Wiping load (gf/cm) | 40 | 40 | 40 | 40 | 40 | 40 | 40 | 40 |
| Deviation of landing position | A | AA | B | B | A | AA | AA | B |
| Image quality | A | A | A | A | A | B | B | AA |
| Wiping performance on nozzle surface | AA | AA | AA | AA | AA | AA | AA | A |
| Scratch resistance | A | B | AA | B | A | B | A | A |

| | Example | | | | | | |
|---|---|---|---|---|---|---|---|
| | 9 | 10 | 11 | 12 | 13 | 14 | 15 |
| Structure of head (scallop b/a) | 5 | 3 | 9 | 5 | 5 | 5 | 5 |
| Maintenance method | W2 | W1 | W1 | W1 | W1 | W1 | W1 |
| Primary heating step | Yes | Yes | Yes | Yes | Yes | Yes | Yes |
| Surface temperature of recording medium (° C.) | 35 | 35 | 35 | 35 | 35 | 35 | 35 |
| Type of aqueous ink composition | Ink A | Ink A | Ink A | Ink A | Ink A | Ink A | Ink A |
| Type of maintenance liquid | Maintenance liquid A | Maintenance liquid A | Maintenance liquid A | Maintenance liquid A | Maintenance liquid A | — | Maintenance liquid B |
| Amount of maintenance liquid applied (g) | 0.7 | 0.7 | 0.7 | 0.7 | 0.35 | — | 0.7 |
| Wiping load (gf/cm) | 40 | 40 | 40 | 30 | 40 | 40 | 40 |
| Deviation of landing position | B | B | AA | A | A | A | A |
| Image quality | A | A | A | A | A | A | A |
| Wiping performance on nozzle surface | AA | AA | AA | A | A | A | AA |
| Scratch resistance | A | A | A | A | A | A | A |

| | Example | | | | | | Comparative example | |
|---|---|---|---|---|---|---|---|---|
| | 16 | 17 | 18 | 19 | 20 | 21 | 1 | 2 |
| Structure of head (scallop b/a) | 5 | 5 | 5 | 5 | 5 | 5 | 5 | 5 |
| Maintenance method | W1 | W1 | W1 | W1 | W1 | W1 | Rubber wiper | FL + Rubber wiper |
| Primary heating step | Yes | Yes | Yes | Yes | Yes | Yes | Yes | Yes |
| Surface temperature of recording medium (° C.) | 35 | 35 | 35 | 35 | 35 | 35 | 35 | 35 |
| Type of aqueous ink composition | Ink A | Ink A | Ink A | Ink A | Ink A | Ink A | Ink A | Ink A |
| Type of maintenance liquid | Maintenance liquid C | Maintenance liquid D | Maintenance liquid E | Maintenance liquid F | Maintenance liquid G | Maintenance liquid H | Maintenance liquid A | Maintenance liquid A |
| Amount of maintenance liquid applied (g) | 0.7 | 0.7 | 0.7 | 0.7 | 0.7 | 0.7 | 0.7 | 0.7 |
| Wiping load (gf/cm) | 40 | 40 | 40 | 40 | 40 | 40 | — | — |
| Deviation of landing position | A | A | AA | AA | B | B | C | C |
| Image quality | A | A | A | A | A | A | A | A |
| Wiping performance on nozzle surface | A | A | A | B | B | B | C | C |
| Scratch resistance | A | A | A | A | A | A | A | A |

TABLE 8-continued

|  | Comparative example | | Reference Example | | | | |
| --- | --- | --- | --- | --- | --- | --- | --- |
|  | 3 | 4 | 1 | 2 | 3 | 4 | 5 |
| Structure of head (scallop b/a) | 5 | 5 | 5 | Non-scallop 1 | Non-scallop 2 | Non-scallop 1 | Non-scallop 2 |
| Maintenance method | W1 | Rubber wiper | Suction + rubber wiper | W1 | W1 | | |
| Primary heating step | — | — | Yes | Yes | Yes | Yes | Yes |
| Surface temperature of recording medium (° C.) | 25 | 25 | 35 | 35 | 35 | 35 | 35 |
| Type of aqueous ink composition | Ink A | Ink A | Ink A | Ink A | Ink A | Ink A | Ink A |
| Type of maintenance liquid | Maintenance liquid A | Maintenance liquid A | Maintenance liquid A | Maintenance liquid A | Maintenance liquid A | Maintenance liquid A | Maintenance liquid A |
| Amount of maintenance liquid applied (g) | 0.7 | 0.7 | 0.7 | 0.7 | 0.7 | 0.7 | 0.7 |
| Wiping load (gf/cm) | 40 | — | — | 40 | 40 | — | — |
| Deviation of landing position | AA | AA | AA | AA | AA | AA | AA |
| Image quality | C | C | A | A | A | A | A |
| Wiping performance on nozzle surface | AA | C | C | AA | AA | C | C |
| Scratch resistance | A | A | A | A | A | A | A |

3. Evaluation Results

Table 4 shows the structure of the ink jet recording apparatus as well as the conditions of the aqueous ink composition and the maintenance liquid used in each example, together with the evaluation results.

The examples, in which the nozzle surface of the nozzle with the continuous multistep structure in the recording apparatus for recording by the recording method for applying ink to a heated recording medium was wiped with the absorbent wiping member, had a small deviation of the landing position and high image quality. In contrast, the comparative examples had a large deviation of the landing position or low image quality.

Examples 1, 7, and 8 show that a higher surface temperature of the recording medium during ink application resulted in higher image quality, and a lower surface temperature of the recording medium during ink application resulted in a smaller deviation of the landing position.

Examples 1 to 3 show that a lower resin particle content of the ink resulted in a smaller deviation of the landing position. Thus, the resin particles are probably related to the deviation of the landing position. A higher resin particle content of the ink resulted in higher scratch resistance.

Examples 1, 10, and 11 show that a higher ratio (b/a) of the continuous multistep structure of the nozzle resulted in a smaller deviation of the landing position.

Examples 1 and 14 to 21 show that wiping with the wiping member provided a good landing position irrespective of the use of the maintenance liquid, and a smaller deviation of the landing position or higher wiping performance on the nozzle surface was achieved with some types of maintenance liquid.

Comparative Examples 1 and 2 show that wiping with the non-absorbent wiping members resulted in a large deviation of the landing position. These wiping members do not absorb ink and had poor wiping performance on the nozzle surface. Although the nozzle surface was wiped clean to eliminate its influence in the evaluation of the deviation of the landing position, the use of these wiping members caused a large deviation of the landing position. Comparative Example 2 had a large deviation of the landing position, though the ink in the nozzle was discharged by flushing. Thus, wiping with the absorbent wiping members in the examples probably suppressed the deviation of the landing position.

Comparative Examples 3 and 4 show that no heating of the recording medium during ink application suppressed the deviation of the landing position. It is assumed that without heating only a few or no accumulated material is formed, and the deviation of the landing position is not significant. No heating, however, caused another problem of markedly low image quality in Comparative Examples 3 and 4.

Reference Example 1 shows that suction cleaning for discharging the ink from the nozzle by suction could suppress the deviation of the landing position. The suction cleaning, however, had drawbacks of an increased amount of wasted ink due to the suction and an increased maintenance time due to a long suction time. The wiping performance on the nozzle surface was also poor.

Reference Examples 2 to 5 show that the use of the nozzle without the continuous multistep structure did not cause problems associated with accumulated materials and problems resulting from the continuous multistep structure and problems associated with the deviation of the landing position caused by accumulated materials.

Although not shown in the table, an ink was prepared in the same manner as the ink A except that no resin particles were contained, and was examined in the same manner as in Comparative Example 1. The deviation of the landing position was rated AA, and the scratch resistance was rated C. This shows that resin particles in ink can provide high scratch resistance but may cause a problem associated with the deviation of the landing position.

The second aspect of the present disclosure may be as follows:

[1] A maintenance method for an ink jet recording apparatus that performs recording on a recording medium, wherein the ink jet recording apparatus includes an ink jet head and ejects an aqueous ink composition from a nozzle of the ink jet head onto a heated recording medium to perform recording, the ink jet head has a nozzle having a continuous multistep structure on its inner wall, the aqueous ink composition contains water and resin particles, and the maintenance method includes a wiping step of wiping a nozzle surface of the ink jet head with an absorbent wiping member.

[2] The maintenance method according to 1,
wherein the resin particle content is 3.0% or more by mass of the total amount of the aqueous ink composition.

[3] The maintenance method according to 1 or 2,
wherein the ratio b/a of the distance b between adjacent raised portions of the continuous multistep structure to the depth a of each recessed portion of the continuous multistep structure ranges from 1.0 to 25.

[4] The maintenance method according to any one of 1 to 3,
the wiping member contains cellulose fiber.

[5] The maintenance method according to any one of 1 to 4,
wherein the continuous multistep structure is formed by alternately performing etching of a silicon wafer in the thickness direction and protection of an etching sidewall many times.

[6] The maintenance method according to any one of 1 to 5,
wherein the aqueous ink composition does not contain an organic solvent with a normal boiling point of more than 280° C. that constitutes more than 2.0% by mass of the total amount of the aqueous ink composition.

[7] The maintenance method according to any one of 1 to 6,
wherein the heated recording medium has a surface temperature of 45° C. or less.

[8] The maintenance method according to any one of 1 to 7,
wherein the recording medium is a low-absorbent recording medium or a non-absorbent recording medium.

[9] The maintenance method according to any one of 1 to 8,
wherein wiping is performed with a maintenance liquid in the wiping.

[10] The maintenance method according to 9,
wherein the maintenance liquid contains water, and
the water content is 80% or more by mass of the total amount of the maintenance liquid.

[11] The maintenance method according to 9 or 10,
wherein the maintenance liquid contains an organic solvent, and
the organic solvent content ranges from 0.5% to 20% by mass of the total amount of the maintenance liquid.

[12] The maintenance method according to 11,
wherein the organic solvent in the maintenance liquid contains a glycol ether or an alkanediol having five or more carbon atoms.

[13] The maintenance method according to any one of 9 to 12,
further including an application step of applying the maintenance liquid to the nozzle surface or the wiping member.

[14] The maintenance method according to any one of 9 to 13,
wherein the maintenance liquid does not contain a surfactant that constitutes more than 0.01% by mass of the total mass of the maintenance liquid.

[15] A recording apparatus that includes
an ink jet head for ejecting an aqueous ink composition containing water and resin particles,
a wiping mechanism for wiping a nozzle surface of the ink jet head with an absorbent wiping member, and
a heating mechanism for heating a recording medium,
wherein the ink jet head has a continuous multistep structure on a nozzle inner wall, and
maintenance is performed by the maintenance method according to any one of 1 to 14.

What is claimed is:

1. A maintenance method for an ink jet recording apparatus that performs recording using an ink composition and a treatment liquid containing a coagulant,
wherein the ink jet recording apparatus has an ink jet head for ejecting the ink composition,
the method comprises a wiping step of wiping a nozzle-forming surface of the ink jet head with a maintenance liquid and an absorbent wiping member, and
the maintenance liquid contains water that constitutes 80% or more by mass of a total mass of the maintenance liquid, and
the maintenance liquid contains an organic solvent that constitutes 0.5% to 5% by mass of the total mass of the maintenance liquid.

2. The maintenance method according to claim 1, wherein the maintenance liquid contains an organic solvent that constitutes 0.5% to 3% by mass of the total mass of the maintenance liquid.

3. The maintenance method according to claim 2, wherein the organic solvent contains an alkanediol having five or more carbon atoms.

4. The maintenance method according to claim 1, wherein the nozzle-forming surface has a step.

5. The maintenance method according to claim 1, wherein the maintenance liquid has a contact angle of 60 degrees or more to the nozzle-forming surface.

6. The maintenance method according to claim 1, wherein the maintenance liquid has a surface tension of 20 mN/m or more.

7. The maintenance method according to claim 1, wherein the wiping member contains cellulose fiber.

8. The maintenance method according to claim 1, wherein the coagulant contains a polyvalent metal salt, an organic acid, or a cationic polymer.

9. The maintenance method according to claim 1, wherein the ink jet head includes a first nozzle array for ejecting the ink composition and a second nozzle array for ejecting the treatment liquid.

10. The maintenance method according to claim 9, wherein
the first nozzle array and the second nozzle array have an overlapping portion when projected in a main scanning direction of the ink jet head and are arranged on the nozzle-forming surface of the ink jet head, and
the ink jet recording apparatus performs the recording by performing a main scanning for applying the ink composition and the treatment liquid to a region of a recording medium multiple times.

11. The maintenance method according to claim 1, further comprising:
an application step of applying the maintenance liquid to the nozzle-forming surface or the wiping member before the wiping step.

12. The maintenance method according to claim 1, wherein the ink composition contains a pigment that constitutes 2% or more by mass of a total mass of the ink composition.

13. The maintenance method according to claim 1, wherein the maintenance liquid does not contain a surfactant that constitutes more than 0.1% by mass of the total mass of the maintenance liquid.

14. A maintenance liquid for use in the maintenance method according to claim 1, comprising:
   water that constitutes 80% or more by mass of the total mass of the maintenance liquid.

\* \* \* \* \*